US009915852B2

(12) United States Patent
Vermeulen et al.

(10) Patent No.: US 9,915,852 B2
(45) Date of Patent: *Mar. 13, 2018

(54) SYSTEMS FOR NONLINEAR OPTICAL WAVE-MIXING

(71) Applicant: VRIJE UNIVERSITEIT BRUSSEL, Brussels (BE)

(72) Inventors: Nathalie Vermeulen, Gooik (BE); Hugo Thienpont, Gooik (BE)

(73) Assignee: VRIJE UNIVERSITEIT BRUSSEL, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,097

(22) Filed: Mar. 24, 2017

(65) Prior Publication Data

US 2017/0199443 A1  Jul. 13, 2017

Related U.S. Application Data

(63) Continuation-in-part of application No. PCT/EP2015/072049, filed on Sep. 24, 2015, which
(Continued)

(51) Int. Cl.
*G02F 1/35* (2006.01)
*G02F 2/02* (2006.01)

(52) U.S. Cl.
CPC .......... *G02F 1/3544* (2013.01); *G02F 1/3501* (2013.01); *G02F 1/3534* (2013.01);
(Continued)

(58) Field of Classification Search
CPC .................................................... G02F 1/3544
See application file for complete search history.

(56) References Cited

U.S. PATENT DOCUMENTS 7,200,308 B2    4/2007   Hochberg et al.
7,532,656 B2    5/2009   Yang et al.
(Continued)

OTHER PUBLICATIONS

Bonaccorso et al., "Solution Processing of Graphene, Topological Insulators and Other 2d Crystals for Ultrafast Photonics", vol. 4, No. 1, Jan. 1, 2014. 16 Pages.
(Continued)

*Primary Examiner* — Rhonda Peace
(74) *Attorney, Agent, or Firm* — Justin J. Cassell; Workman Nydegger

(57) ABSTRACT

A system for conversion or amplification using quasi-phase matched nonlinear optical wave-mixing includes a first radiation source for providing a pump radiation beam, a second radiation source for providing a signal radiation beam, a bent structure for receiving the pump radiation beam and the signal radiation beam, and an outcoupling radiation propagation portion for coupling out an idler radiation beam generated in the bent structure. A radiation propagation portion of the bent structure is made of a uniform three-dimensional material at least partly covered by a two-dimensional or quasi-two-dimensional material layer and has a dimension taking into account the spatial variation of the nonlinear optical susceptibility along the radiation propagation portion as experienced by radiation traveling along the bent structure for obtaining quasi-phase matched nonlinear optical wave-mixing in the radiation propagation portion. The dimension thereby is substantially inverse proportional with the linear phase mismatch for the nonlinear optical process.

20 Claims, 14 Drawing Sheets

Related U.S. Application Data is a continuation of application No. 14/494,658, filed on Sep. 24, 2014, now Pat. No. 9,223,187.

(52) U.S. Cl.
CPC ............ *G02F 2001/3509* (2013.01); *G02F 2001/3548* (2013.01)

(56) References Cited

U.S. PATENT DOCUMENTS

| | | | |
|---|---|---|---|
| 8,873,133 B2* | 10/2014 | Vermeulen | G02F 1/395 359/327 |
| 9,223,187 B2* | 12/2015 | Vermeulen | G02F 1/3519 |
| 2004/0233511 A1 | 11/2004 | Kurz et al. | |
| 2006/0092500 A1 | 5/2006 | Melloni et al. | |
| 2006/0132901 A1 | 6/2006 | Miller | |
| 2006/0159398 A1 | 7/2006 | Knox et al. | |
| 2013/0010351 A1 | 1/2013 | Vermeulen et al. | |
| 2016/0161675 A1* | 6/2016 | Englund | B82Y 20/00 250/206 |
| 2017/0146738 A1* | 5/2017 | Xu | G02B 6/1225 |
| 2017/0199443 A1* | 7/2017 | Vermeulen | G02F 1/3544 |

OTHER PUBLICATIONS

Donnelly et al., "Ultra-Large Nonlinear Parameter in Graphene-silicon Waveguide Structures", vol. 22, No. 19, Sep. 22, 2014, 12 Pages.
Gu et al., "Coherent Four-Wave Mixing on Hybrid Graphene-Silicon Photonic Crystals", IEEE Journal of Selected Topics in Quantum Electronics, vol. 20, No. 1, Jan./Feb. 2014, 6 Pages.
Kelvin J.A. et al., "Waveguide Engineering of Graphene's Nonlinearity", AIP Publishing LLC, Applied Physics Letters, vol. 105, 2014, 4 Pages.
Moss et al., "New CMOS-Compatible Platforms Based on Silicon Nitride and Hydex for Nonlinear Optics", Nature Photonics, vol. 7, Aug. 2013, 12 Pages.
Wang et al., "Broadband Ultrafast Nonlinear Absorption and Nonlinear Refraction of Layered Molybdenum Dichalcogenide Semiconductors", Nanoscale, vol. 6, pp. 10530-10535, 2014.
International Search Report from PCT Application No. PCT/EP2015/072049, dated Nov. 27, 2015.
Turner et al., "Ultra-Low Power Parametric Frequency Conversion in a Silicon Microring Resonator", Optics Express, vol. 16, No. 7, Mar. 31, 2008, pp. 4881-4887.
Yang et al., "Enhanced Second-Harmonic Generation in AlGaAs Microring Resonators", Optics Letters, vol. 32, No. 7, Apr. 1, 2007, pp. 826-828.
Ferrera et al., "Low Power Parametric Wave-Mixing in a Zero Dispersive CMOS Compatible Micro-Ring Resonator", IEEE, 2009, pp. 481-482.
International Search Report for PCT/EP2010/064750, dated Jan. 14, 2011.
Written Opinion for PCT/EP2010/064750, dated Sep. 18, 2012.
Vermeulen et al., "Applications of Coherent Anti-Strokes Raman Scattering in Silicon Photonics", The Institution of Electrical Engineers, vol. 7606, Jan. 24, 2010, (Abstract).
Vermeulen et al., "Enhancing the Efficiency of Silicon Raman Converters", Photonic Integrated Circuits II, vol. 7719, Apr. 12, 2010. (Abstract).
Vermeulen et al.,"Cavity-Enhanced Quasi-Phase-Matched Wavelength Conversion in Silicon Ring Resonators: Two Approaches", 2010 IEEE Photonics Society Summer Topical Meeting Series, vol. 7719, pp. 92-93, Jul. 19, 2010. (Abstract).

\* cited by examiner

Distance traveled along the ring (um)

SYSTEMS FOR NONLINEAR OPTICAL WAVE-MIXING

FIELD OF THE INVENTION

The present invention relates to the field of optics. More particularly, the present invention relates to methods and systems for Raman converters, parametric converters and parametric amplifiers with cavity enhancement and with quasi-phase-matching.

BACKGROUND OF THE INVENTION

Over the past several decades there has been growing interest in the development of devices based on second-order nonlinear effects such as sum-frequency generation (SFG) and difference frequency generation (DFG) and devices based on third-order nonlinear effects such as Raman-resonant four-wave-mixing (FWM) and Kerr-induced four-wave-mixing (FWM). SFG, DFG and Kerr-induced FWM are parametric light-matter interactions that are not resonant with a material level and that are used in parametric converters and parametric amplifiers. Raman-resonant FWM is a light-matter interaction that is perfectly resonant or almost perfectly resonant with a characteristic energy level of the material such as a vibrational energy level and that is used in Raman converters. SFG, DFG and Kerr-induced FWM involve a pump radiation beam at frequency $\omega_p$, a signal radiation beam at frequency $\omega_s$, and an idler radiation beam at frequency $\omega_i$. Raman-resonant FWM involves a pump radiation beam at frequency $\omega_p$, a Stokes radiation beam at frequency $\omega_{strokes}$ that is lower than the pump frequency, and an anti-Stokes radiation beam at frequency $\omega_{anti-stokes}$ that is higher than the pump frequency. One also uses the terms signal and idler for the Stokes and anti-Stokes radiation beams, respectively, or vice versa, and uses $\omega_s$ and $\omega_i$ to denote their frequencies. Due to the wavelength versatility offered by SFG, DFG, Raman-resonant FWM and Kerr-induced FWM, these processes feature a multitude of application possibilities in different domains such as optical communication and spectroscopy.

Basically, Raman-resonant FWM and Kerr-induced FWM are interactions between two pump photons, one signal photon and one idler photon, and the frequencies of these photons $\omega_p$, $\omega_s$ and $\omega_i$ satisfy the relation $2\omega_p-\omega_s-\omega_i=0$. For Raman-resonant FWM one has in addition that $|\omega_p-\omega_s|=2\pi\times\Delta_R$, with $\Delta_R$ being the Raman shift of the considered Raman-active material. In the case of SFG and DFG there is an interaction between 1 pump photon, one signal photon and one idler photon, and the frequencies of these photons $\omega_p$, $\omega_s$ and $\omega_i$ satisfy the relation $\omega_p+\omega_s=\omega_i$ fpr SFG and $\omega_p-\omega_s=\omega_i$ for DFG. The efficiency of all processes depends on the pump intensity and on the processes' phase mismatch. The linear part $\Delta k_{linear}$ of the phase mismatch for Raman-resonant FWM and Kerr-induced FWM is given by $$\Delta k_{linear}=2k_p-k_s-k_i$$

where $k_{\{p,s,a\}}=\omega_{\{p,s,a\}}\times n_{\{p,s,a\}}/c$ are wave numbers with $n_{\{p,s,a\}}$ representing the effective indices of the pump, signal and idler waves, respectively. One can also write $\Delta k_{linear}$ as $$\Delta k_{linear} = -\beta_2(\Delta\omega)^2 - \frac{1}{12}\beta_4(\Delta\omega)^4$$

where $\beta_2=d^2k/d\omega^2$ is the group velocity dispersion (GVD) at the pump wavelength, $\beta_4=d^4k/d\omega^4$ is the fourth-order dispersion at the pump wavelength, and $\Delta\omega$ the frequency difference between the pump and signal waves. For SFG the linear part $\Delta k_{linear}$ of the phase mismatch is given by $$\Delta k_{linear}=k_p+k_s-k_i$$

For DFG the linear part $\Delta k_{linear}$ of the phase mismatch is given by $$\Delta k_{linear}=k_p-k_s-k_i$$

The total phase mismatch for these processes also contains a nonlinear part that is function of the pump intensity, but since linear phase mismatches are considered here that are mostly much larger than the nonlinear part of the phase mismatch, the latter can be neglected in the remaining part of this text.

Due to their nonlinear nature, all above-mentioned processes perform best at high optical intensities. These can be obtained by tightly confining the light for example in a nanowire waveguide and also by employing ring structures, whispering-gallery-mode disk resonators, or any other resonator structure in which the incoming light waves are resonantly enhanced. Regarding the requirement of having a small effective phase mismatch for the wavelength conversion processes, much progress has been made over the past several years, in particular for converters based on silicon waveguides. For these converters, by engineering the dispersion of a silicon nanowire waveguide one can obtain phase-matched Kerr-induced FWM in the near-infrared for pump-signal frequency shifts with an upper limit of 52 THz (i.e., pump-signal wavelength differences up to 418 nm in the near-infrared region).

Notwithstanding the broad applicability of this phase-matched conversion technique, there are circumstances, applications, and materials where an alternative approach can be useful. First of all, not all materials used for SFG, DFG, Raman-resonant or Kerr-induced FWM are as easily workable as silicon to fabricate waveguide structures, which implies that not all materials can benefit from the waveguide-based phase-matching technique outlined above. Furthermore, even if one considers only a material such as silicon for which the waveguide-based phase-matching technique described above is well developed, it is important to know that, although the phase-matching bandwidth of the silicon nanowire referred to above is more than wide enough to enable phase-matched Raman-resonant FWM in the near-infrared at a pump-signal frequency shift of 15.6 THz, the dispersion-engineered geometry of the waveguide is such that does not comply with the fabrication constraints of multiproject-wafer-oriented silicon photonics foundries, which rely on conventional semiconductor processing technology and employ a standard waveguide thickness of typically 220 nm. Since the use of such foundries can pave the way to the large-volume fabrication of integrated photonic components at low cost, adhering to these foundry standards is a natural strategy to exploit the full potential of silicon photonic devices. Furthermore, the developed silicon-based converters often are not compact and require propagation distances of at least 1 cm to achieve substantial conversion efficiencies. This leads to device footprints that are too large for realizing cost-effective photonic integrated circuits. Also for SFG and DFG in silicon nanowires, there are dispersion-engineering issues. To establish SFG and DFG in silicon, one usually applies strain on a silicon nanowire to induce the second-order nonlinearity that is needed for these processes and hence make the nanowire a quadratically nonlinear optical medium. Because of the very large pump-signal frequency shifts typically used in SFG and DFG, it is practically impossible to engineer the dispersion of the strained silicon nanowires in such a way that phase-matched SFG or DFG is obtained. Hence, it is challenging to achieve efficient SFG or DFG using only dispersion engineering.

One suggestion has been to establish quasi-phase-matching for SFG, DFG, Raman-resonant FWM or Kerr-induced FWM by periodically modifying the material properties within the medium through which the light propagates. This traditional quasi-phase-matching technique for these nonlinear processes can be understood as follows: In case nothing is done about the phase mismatch, the idler intensity for radiation would continuously oscillate along the propagation path between a maximal value and zero, as the phase-mismatch-induced dephasing of the fields—this dephasing evolves periodically with the propagation distance—causes the nonlinear optical processes to either increase or decrease the idler intensity along the propagation path. When using traditional quasi-phase-matching for these processes, one adjusts the propagation regions behind the positions of maximal idler intensity, so that one does not have a total drop down of the idler intensity in these regions but at the same time the fields' dephasing, accumulated up to the positions of maximal idler intensity, can evolve back to zero in these adjusted regions. Hence, after traversing these adjusted areas the idler intensity can start growing again towards a maximum. The type of "adjustment" that needs to be applied to these propagation regions is that the susceptibility should be reversed in sign there for the Raman-resonant or Kerr-induced FWM or for the SFG and DFG processes, so that these nonlinear processes cannot establish a decrease of the idler intensity in these areas whereas the fields' dephasing can still evolve back to zero. This sign reversal is the ideal case; if this is not possible, then quasi-phase-matching can also be obtained by making the susceptibility zero in the "adjustment" regions. Both the latter type of "adjustment" and the ideal "adjustment" of susceptibility sign reversal is traditionally implemented using a conversion medium where the material properties within the medium are periodically manipulated. This is a complex approach and disadvantageous from a practical point of view. Furthermore, like the dispersion-engineered phase matching approach described earlier, this approach typically yields too large device footprints to realize cost-effective photonic integrated circuits.

SUMMARY OF THE INVENTION

It is an object of embodiments of the present invention to provide efficient methods and systems for nonlinear optical wave mixing, such as for example SFG, DFG and FWM, e.g. Raman-resonant FWM and/or Kerr-induced FWM. It is an advantage of at least some embodiments of the present invention that efficient nonlinear optical wave mixing, such as for example SFG, DFG and FWM, e.g. Raman-resonant FWM and/or efficient Kerr-induced FWM, can be obtained at wavelengths suitable for use in e.g. telecommunication and spectroscopy.

Nonlinear optical wave mixing may in one example be a third order process, such as four wave mixing, or in another example be a second order process, such as three wave mixing.

It is an advantage of embodiments of the present invention that efficient systems are obtained, which can be made using conventional semiconductor processing technology.

It was surprisingly found that by using a two-dimensional material or quasi-two-dimensional material on top of the three-dimensional medium through which the light propagates, efficient systems for obtaining nonlinear optical wave mixing are obtained.

It is an advantage of embodiments of the present invention that adding a two-dimensional material or quasi-two-dimensional material on top of a uniform three-dimensional medium a better device compactness and smaller device footprints can be obtained.

It is an advantage of at least some embodiments of the present invention, e.g. for embodiments wherein a spiral based converter is used, that quasi-phase-matching can be obtained not just for one single output wavelength but for a band of output wavelengths.

It is an advantage of at least some embodiments of the present invention that efficient closed structure Raman converters such as e.g. ring or disc Raman converters, efficient closed structure parametric converters such as e.g. ring or disc parametric converters, and efficient closed structure parametric amplifiers, e.g. ring or disc parametric amplifiers are provided as well as corresponding methods. It is an advantage of at least some embodiments according to the present invention that methods and systems are provided that allow obtaining relatively high efficiencies using cavity-enhanced quasi-phase matched wave mixing such as cavity-enhanced quasi-phase-matched DFG, cavity-enhanced quasi-phase-matched SFG, cavity-enhanced quasi-phase-matched Raman-resonant FWM and/or using cavity-enhanced quasi-phase-matched Kerr-induced FWM in a resonator. Such cavity-enhanced quasi-phase matched wave mixing may in one example be a third order process, such as four wave mixing, or in another example be a second order process, such as three wave mixing.

It is an advantage of at least some embodiments according to the present invention that cavity-enhanced quasi-phase-matched wave mixing, such as cavity-enhanced quasi-phase-matched SFG, cavity-enhanced quasi-phase-matched DFG, cavity-enhanced quasi-phase-matched Raman-resonant FWM, cavity-enhanced quasi-phase-matched Kerr-induced FWM, in a resonator structure, e.g. ring or disc resonator, can provide both a small effective phase mismatch and a high pump intensity, resulting in a boost of the nonlinear optical wave mixing efficiency, e.g. SFG efficiency, DFG efficiency, Raman-resonant FWM efficiency and /or of the Kerr-induced FWM efficiency. This is especially advantageous for those cases where phase-matched wave mixing, e.g. phase-matched SFG, DFG, Raman-resonant FWM or Kerr-induced FWM performs badly, i.e. in the cases where the group velocity dispersion at the pump wavelength is large and/or the frequency difference between the pump and the signal is large.

It is an advantage of embodiments according to the present invention that efficient nonlinear optical wave matching, e.g. efficient SFG, efficient DFG, efficient Raman-resonant FWM or efficient Kerr-induced FWM can be obtained for any value of the linear phase mismatch $\Delta k_{linear}$.

It is an advantage of embodiments according to the present invention that no dispersion engineering of the medium where the light propagates is required to obtain efficient SFG, efficient DFG, efficient Raman-resonant FWM or efficient Kerr-induced FWM.

It is an advantage of embodiments according to the present invention that it is not necessary to use only materials out of which waveguides can be fabricated and that other structures such as whispering-gallery-mode discs and discs with a rim polished according to a polygone shape can also be used.

It is an advantage of at least some embodiments according to the present invention that when working with a waveguide its geometry can be chosen freely without dispersion engineering constraints, and that the waveguide dimensions can be chosen such that they can be fabricated using conventional semiconductor processing technology.

It is an advantage of embodiments according to the present invention that suitable conditions for quasi-phase matched wave mixing, such as for quasi-phase-matched SFG, for quasi-phase-matched DFG, for quasi-phase-matched Raman-resonant FWM and for quasi-phase-matched Kerr-induced FWM are obtained using a uniform three-dimensional material. More particularly, it is an advantage that the obtained system and method is relatively simple and does e.g. not require active periodical adaptation of the nonlinear optical properties within the three-dimensional medium. It is an additional advantage of at least some embodiments according to the present invention that also the two-dimensional or quasi-two dimensional material top layer is uniform.

It is an advantage of the embodiments, where a two-dimensional or quasi-two-dimensional material layer is used which is patterned or which is locally chemically or electrically modified, that the patterning or local chemical modification or local electrical modification can be implemented along pie shapes that have a high tolerance for spatial fabrication deviations.

It is an advantage of at least some embodiments of the present invention that efficient, single-pump Kerr-induced FWM can be obtained for a large pump-signal frequency shift in a spectral domain where the dispersion characteristics of the medium where the light propagates are not optimally engineered for phase-matched Kerr-induced FWM.

It is an advantage of at least some embodiments according to the present invention that a high pump intensity in the Raman converter, in the parametric converter, and in the parametric amplifier does not need to be provided using a high-power pump, but that the pump is resonantly enhanced in the medium for obtaining a sufficiently high pump power. Alternatively or in addition thereto, the signal input power, and the idler power also can be resonantly enhanced regardless the value of the linear phase mismatch $\Delta k_{linear}$ resulting in high intensities being achieved. In other words also the signal input power initially injected does not need to be a high signal input power pump.

The above objective is accomplished by a method and device according to the present invention.

The present invention relates to a system for conversion or amplification using quasi-phase matched nonlinear optical wave mixing, the system comprising a first radiation source for providing a pump radiation beam, a second radiation source for providing a signal radiation beam, and a bent structure for receiving the pump radiation beam and the signal radiation beam, wherein a radiation propagation portion, e.g. waveguiding portion, of the bent structure comprises a uniform three-dimensional material at least partly covered by a two-dimensional or quasi-two-dimensional material layer and wherein the bent structure comprises a dimension taking into account the spatial variation of the nonlinear susceptibility along the radiation propagation portion as experienced by radiation travelling along the bent structure for obtaining quasi-phase-matched nonlinear optical wave mixing in the radiation propagation portion, the dimension being substantially inverse proportional with the linear phase mismatch for nonlinear optical wave mixing and an outcoupling radiation propagation portion, e.g. waveguiding portion, for coupling out an idler radiation beam generated in the bent structure. It is an advantage of embodiments according to the present invention that quasi-phase matching conditions can be achieved.

The two-dimensional material layer or quasi-two-dimensional material layer may be inducing the quasi-phase matched wave mixing. Where in embodiments of the present invention reference is made to a two-dimensional material or quasi-two-dimensional material, reference is made to a material that consists of a single layer of atoms, or several layers of atoms. In case of several layers of atoms, it is possible that the outer layers have different properties than the inner layers.

The two-dimensional material layer or quasi-two-dimensional material layer may comprise one or a combination of graphene, graphyne, borophene, germanene, silicene, stanine, phosphorene, metals, 2D supracrystals, hexagonal boron nitride, germanane, nickel HITP, transition metal di-chalcogenides (TMDCs), MXenes, black phosphorus, or topological insulators.

The three-dimensional material may be any or a combination of silicon, germanium, GaAs, InGaAs, diamond, cadmium telluride, gallium indium phosphide, indium phosphide, SiN, $Ba(NO_3)_2$, $CaCO_3$, $NaNO_3$, tungstate crystals, $BaF_2$, potassium titanyl phosphate (KTP), potassium dihydrogen phosphate (KDP), $LiNbO_3$, deuterated potassium dihydrogen phosphate (DKDP), lithium triborate (LBO), barium borate (BBO), bismuth triborate (BIRO), $LiIO_3$, $BaTiO_3$, yttrium iron garnet (YIG), AlGaAs, CdTe, $AgGaS_2$, $KTiOAsO_4$ (KTA), $ZnGeP_2$ (ZGP), $RBTiOAsO_4$ (RTA).

In some embodiments, the three-dimensional material may be applied as a waveguide structure.

The radiation propagation portion may comprise a uniform three-dimensional medium covered by a two-dimensional or quasi-two-dimensional material layer. In some embodiments the layer of two-dimensional material or quasi-two-dimensional material may be a layer extending over the full surface of the underlying three-dimensional medium.

The two-dimensional or quasi-two-dimensional material layer may be a graphene layer.

The two-dimensional material layer may be adapted for having an electric current flowing through it.

The radiation propagation portion may comprise a uniform three-dimensional material covered by a two-dimensional or quasi-two-dimensional material layer that is patterned.

The two-dimensional or quasi-two-dimensional material layer may be patterned such that periodic variations in the nonlinear optical susceptibility are introduced.

The two-dimensional or quasi-two-dimensional material layer may have a pie-shaped patterning.

The two-dimensional or quasi-two-dimensional material layer may be a full layer, but wherein the layer is locally chemically or electrically modified.

The nonlinear optical wave mixing may be a third order process, such as four wave mixing, or a second order process such as three wave mixing. Three wave mixing may comprise sum-frequency generation or difference frequency generation.

The system for conversion or amplification may be a system for Raman conversion, parametric conversion or parametric amplification. It is an advantage of at least some embodiments according to the present invention that the structure may be closed, so that the structure is a resonator allowing to establish cavity enhancement. In at least some embodiments according to the present invention, the closed structure may be a ring structure or a disc structure, such as for example a circular ring, an elliptical ring, a rectangular ring, an octagonal ring, a circular disc, an elliptical disc, a rectangular disc, an octagonal disc, etc. The structure also may be an open structure such as a snake-like structure, a sickle structure, or a spiral structure.

It is an advantage of at least some embodiments according to the present invention that a relatively simple system can be obtained allowing quasi-phase-matched nonlinear optical wave mixing, e.g. quasi-phase-matched sum-frequency generation (SFG), quasi-phase-matched difference frequency generation (DFG), quasi-phase-matched Raman-resonant FWM or quasi-phase-matched Kerr-induced FWM. It is an advantage of at least some embodiments according to the present invention that no active alteration of the material properties of the three-dimensional medium and the two-dimensional or quasi-two-dimensional top layer are required for accurate operation, so that both the three-dimensional medium and the two-dimensional or quasi-two-dimensional top layer are uniform.

The bent structure may be a ring structure or disc structure.

The ring structure or disc structure may be circular, and the radius R of the ring structure or disc structure may be determined substantially inverse proportional with the linear phase mismatch for nonlinear optical wave mixing. The radius R thereby may be defined as the distance from the center of the circle to the central longitudinal axis in the circular radiation propagation area. The linear phase mismatch thereby may be defined by the following equations:

$$\Delta k_{linear} = k_p + k_s - k_i$$

for SFG, $$\Delta k_{linear} = k_p - k_s - k_i$$

for DFG, and $$\Delta k_{linear} = 2k_p - k_s - k_i$$

for Raman-resonant FWM and Kerr FWM.

The radius R of the circular ring structure may be determined by the radius R being substantially equal to a factor s, equal to a positive or negative integer, times one divided by the linear phase mismatch for Raman-resonant FWM or divided by the linear phase mismatch for Kerr-induced FWM, i.e. it substantially fulfills relation $$R = s \frac{1}{\Delta k_{linear}}$$

with s being a factor equal to a positive or negative integer so that R has a positive value, and $\Delta k_{linear}$ being linear phase mismatch for Raman-resonant FWM or being the linear phase mismatch for Kerr-induced FWM. The radius R of the circular ring structure may be determined by the radius R being substantially equal to a factor s, equal to a positive or negative integer, times one divided by the linear phase mismatch for SFG or divided by the linear phase mismatch for DFG, i.e. it substantially fulfills relation $$R = s \frac{1}{\Delta k_{linear}}$$

with s being a factor equal to a positive or negative integer so that R has a positive value, and $\Delta k_{linear}$ being linear phase mismatch for SFG or being the linear phase mismatch for DFG. With substantially being equal to or substantially fulfilling the relation there is meant that advantageously the radius is equal or the relation is fulfilled, but that a deviation on the design rule is allowed wherein the quasi-phase-matched SFG efficiency, quasi-phase-matched DFG efficiency or quasi-phase-matched FWM efficiency is still high due to the explored effects. E.g. for a deviation of 5% on the design rule this is a value which certainly lies within the fabrication tolerances that can be achieved nowadays a quasi-phase-matched nonlinear optical wave mixing efficiency of 0.8 times the maximal efficiency at zero deviation may still be guaranteed. For a deviation of 10% on the design rule, a quasi-phase-matched nonlinear optical wave mixing efficiency of 0.5 times the maximal efficiency at zero deviation may still be guaranteed. For a deviation of 20% on the design rule, a quasi-phase-matched nonlinear optical wave mixing efficiency of 0.3 times the maximal efficiency at zero deviation may still be guaranteed. For deviations larger than 25% on the design rule, the quasi-phase-matched efficiency might become smaller than 0.2 times the maximal efficiency at zero deviation, and the quasi-phase-matching approach might not be interesting any longer.

The bent structure may have an inscribed circle and/or circumscribed circle having a radius inversely proportional to the linear phase mismatch for nonlinear optical wave mixing, e.g. SFG, DFG, FWM.

The bent structure may have an average radius inversely proportional to the linear phase mismatch for nonlinear optical wave mixing, e.g. SFG, DFG, FWM.

The system furthermore may be adapted to provide a pump radiation beam with wavenumber $k_p$ and a signal radiation beam with wavenumber lc, and result in an idler radiation beam with wavenumber $k_i$, so that at least one of these beams is at resonator resonance, e.g. ring or disc resonance. In ring resonators for example, at least one of the beams' wavenumbers may yield, when multiplying with R, an integer number.

The system may comprise a heating and/or cooling means and a temperature controller for controlling the temperature so that at least one of the pump radiation, the signal radiation and the idler radiation is at resonator resonance.

The materials may be Raman-active materials, and the process may be a quasi-phase-matched Raman-resonant FWM process.

The materials may be Kerr-nonlinear materials and the process may be a quasi-phase-matched Kerr-nonlinear FWM-process.

The materials may be quadratically nonlinear optical materials and the process may be a quasi-phase-matched SFG or DFG process.

It is an advantage of at least some embodiments according to the present invention that quasi-phase-matched nonlinear optical wave mixing, e.g. nonlinear optical four wave mixing or nonlinear optical three wave mixing such as quasi-phase-matched SFG and/or quasi-phase-matched DFG and/or quasi-phase-matched Raman-resonant FWM and/or quasi-phase-matched Kerr-induced FWM in a uniform three-dimensional medium with a uniform two-dimensional or quasi-two-dimensional material layer on top can be obtained so that it does not require special techniques to periodically adapt the material characteristics of the three-dimensional material nor of the two-dimensional or quasi-two-dimensional material layer on top.

The three-dimensional material may be any or a combination of silicon, germanium, GaAs, InGaAs, diamond, cadmium telluride, gallium indium phosphide, indium phosphide, SiN, Ba(NO$_3$)$_2$, CaCO$_3$, NaNO$_3$, tungstate crystals, BaF$_2$, potassium titanyl phosphate (KTP), potassium dihydrogen phosphate (KDP), LiNbO$_3$, deuterated potassium dihydrogen phosphate (DKDP), lithium triborate (LBO), barium borate (BBO), bismuth triborate (BIRO), LiIO$_3$, BaTiO$_3$, yttrium iron garnet (YIG), AlGaAs, CdTe, AgGaS$_2$, KTiOAsO$_4$ (KTA), ZnGeP$_2$ (ZGP), RBTiOAsO$_4$ (RTA). The three-dimensional material may be a crystalline material.

In some embodiments, the three-dimensional material may be applied as a waveguide structure.

It is an advantage of embodiments according to the present invention that nonlinear optical wave mixing processes, such as SFG and/or DFG and/or Raman-resonant FWM and/or Kerr-induced FWM, can be established for wavelengths suitable for e.g. telecommunication and spectroscopy.

It is an advantage of at least some embodiments according to the present invention conventional semiconductor processing technology can be used for obtaining Raman converters, parametric converters or parametric amplifiers.

A controller may be provided for tuning the system with respect to an output wavelength, an output power or an obtained bandwidth.

The system may be adapted for selecting a TE or TM output by selecting a TE or TM input. It is an advantage of at least some embodiments according to the present invention that the polarization of the output is the same as the polarization of the input of the Raman converter, of the parametric converter, and of the parametric amplifier, and thus that no additional polarization filter is required for obtaining a particular polarized output.

The three dimensional material may be a uniform nonlinear optical material.

The present invention also relates to a method for obtaining conversion or amplification, using quasi-phase-matched nonlinear optical wave mixing, the method comprising receiving a pump radiation beam and a signal radiation beam in a bent structure, a radiation propagation portion, e.g. waveguiding portion, of the bent structure comprising a uniform three-dimensional material at least partly covered by a two-dimensional material layer or a quasi-two-dimensional material layer and having a dimension taking into account the spatial variation of the nonlinear optical susceptibility along the radiation propagation portion as experienced by radiation travelling along the bent structure for obtaining quasi-phase-matched nonlinear optical wave mixing in the radiation propagation portion, the dimension being substantially inverse proportional with a linear phase mismatch for nonlinear optical wave mixing, obtaining an idler radiation beam by interaction of the pump radiation beam and the signal radiation beam and coupling out an idler radiation beam from the bent structure. Conversion or amplification may be any of Raman conversion, parametric conversion or parametric amplification. The nonlinear optical wave mixing may be a SFG process, a DFG progress, a Raman-resonant FWM process or a Kerr-induced FWM process.

The method may be performed using a device as described above.

The bent structure may for example be a ring or disc structure, where the pump radiation beam and the signal radiation beam propagate in the ring or disc structure, whereby the ring or disc structure is circular and has a radius R determined substantially inverse proportional with a linear phase mismatch for quasi-phase-matched nonlinear optical wave mixing, e.g. quasi-phase-matched SFG, quasi-phase-matched DFG, quasi-phase-matched Raman-resonant FWM or quasi-phase-matched Kerr-induced FWM.

For three wave mixing processes such as the SFG and DFG processes, the pump radiation beam and the signal radiation beam may be guided in a circular ring structure having a radius substantially fulfilling the relation $$R = s \frac{1}{\Delta k_{linear}}$$

with s being a positive or negative integer so that R has a positive value, and $\Delta k_{linear}$ being the linear phase mismatch for SFG or being the linear phase mismatch for DFG. With substantially fulfilling the relation there is meant that advantageously the relation is fulfilled, but that a deviation on the design rule is allowed wherein the quasi-phase-matched SFG efficiency or quasi-phase-matched DFG efficiency is still high due to the explored effects.

For the FWM processes, the pump radiation beam and the signal radiation beam may be guided in a circular ring structure having a radius substantially fulfilling the relation $$R = s \frac{1}{\Delta k_{linear}}$$

with s being a positive or negative integer so that R has a positive value, and $\Delta k_{linear}$ being the linear phase mismatch for Raman-resonant FWM or being the linear phase mismatch for Kerr-induced FWM.

With substantially fulfilling the relation there is meant that advantageously the relation is fulfilled, but that a deviation on the design rule is allowed wherein the quasi-phase-matched FWM efficiency is still high due to the explored effects.

The method may comprise letting the radiation beams propagate in the ring or disc structure and obtaining ring or disc resonance for at least one of the different radiation beams.

The method may comprise adjusting the in- and/or out-coupling efficiency for adjusting the cavity-enhancement of the radiation beams inside the ring or disc structure.

The method may comprise tuning the system with respect to an output wavelength, an output power or an obtained bandwidth.

The present invention also relates to a method for designing a converter or amplifier using quasi-phase-matched nonlinear optical wave mixing, the converter or amplifier using a pump radiation beam and a signal radiation beam, the method comprising selecting a bent structure suitable for quasi-phase-matched nonlinear optical wave mixing comprising selecting materials for a radiation propagation portion of the bent structure, the radiation propagation portion comprising a uniform three-dimensional material at least partly covered by a two-dimensional material layer or quasi-two-dimensional material layer, and selecting at least one dimension of the radiation propagation portion taking into account the spatial variation of the nonlinear optical susceptibility along the radiation propagation portion as experienced by radiation travelling along the bent structure. The dimension thereby is substantially inverse proportional with the linear phase mismatch for nonlinear optical wave mixing.

The present invention also relates to a computer program product for, when executed on a computer, performing a method and/or controlling a system as described above. The present invention also relates to a data carrier carrying such a computer program product or to the transmission of such a computer program product over a wide or local area network.

In one aspect, the present invention also relates to a system for conversion or amplification using quasi-phase matched nonlinear optical wave mixing, the system comprising a first radiation source for providing a pump radiation beam, a second radiation source for providing a signal radiation beam, and a bent structure for receiving the pump radiation beam and the signal radiation beam, wherein a radiation propagation portion of the bent structure is made of a uniform three-dimensional material and wherein the radiation propagation portion comprises a dimension taking into account the spatial variation of the nonlinear susceptibility along the radiation propagation portion as experienced by radiation travelling along the bent structure for obtaining quasi-phase-matched nonlinear optical wave mixing in the radiation propagation portion, the dimension being substantially inverse proportional with the linear phase mismatch for nonlinear optical wave mixing and an outcoupling radiation propagation portion, e.g. waveguiding portion, for coupling out an idler radiation beam generated in the bent structure. It is an advantage of embodiments according to the present invention that quasi-phase matching conditions can be achieved. The uniform three-dimensional material thereby is a quadratically nonlinear optical material and the process is a quasi-phase-matched sum-frequency generation or quasi-phase-matched difference-frequency generation. It is to be noticed that according to this aspect, there is no need for a layer of two-dimensional or quasi-two-dimensional material to be present on top of the three dimensional material.

In another aspect, the present invention also relates to a method for obtaining conversion or amplification, using quasi-phase-matched nonlinear optical wave mixing, the method comprising receiving a pump radiation beam and a signal radiation beam in a bent structure, a radiation propagation portion of the bent structure being made of a uniform three-dimensional material and comprising a dimension taking into account the spatial variation of the nonlinear optical susceptibility along the radiation propagation portion as experienced by radiation travelling along the bent structure for obtaining quasi-phase-matched nonlinear optical wave mixing in the radiation propagation portion, the dimension being substantially inverse proportional with a linear phase mismatch for nonlinear optical wave mixing, obtaining an idler radiation beam by interaction of the pump radiation beam and the signal radiation beam and coupling out an idler radiation beam from the bent structure.

Said nonlinear optical wave mixing is nonlinear optical three-wave mixing, the uniform three-dimensional material is a quadratically nonlinear optical material and the process is a quasi-phase-matched sum-frequency generation or quasi-phase-matched difference-frequency generation.

Further features of these aspects wherein the three-dimensional material is a quadratically nonlinear optical material may comprise additional features and aspects as described in the different embodiments of the other aspects, but where applicable the covering layer of two-dimensional or quasi-two-dimensional material is omitted.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1A:
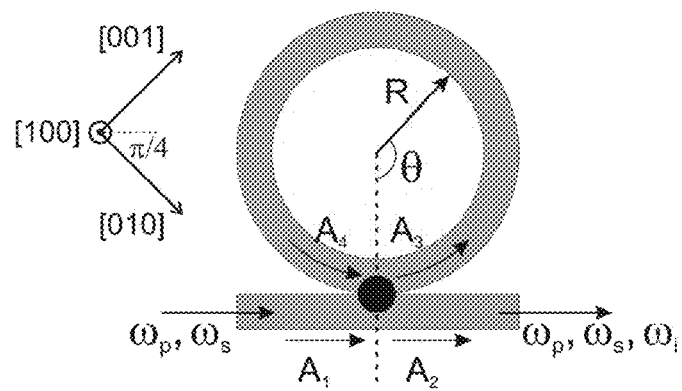
FIG. 1a illustrates a schematic top-view representation of a Raman converter, a parametric converter or a parametric amplifier based on ring made of uniform silicon, according to an embodiment of the present invention.
Figure 1B:
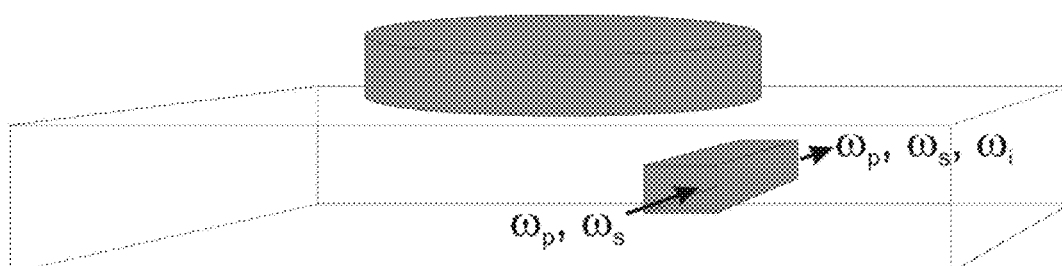
FIG. 1b illustrates a schematic representation of a Raman converter, a parametric converter or a parametric amplifier based on a whispering-gallery-mode disc made of a uniform three-dimensional material where the light is coupled in the disc and out of the disc via a buried waveguide and where the light travels around in the disk close to its rim, and wherein quasi-phase matching according to an embodiment of the present invention can be obtained.
Figure 1C:
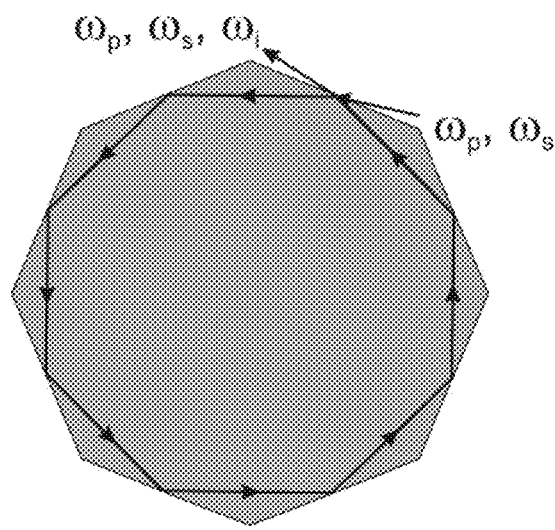
FIG. 1c illustrates a schematic top-view representation of a Raman converter, a parametric converter or a parametric amplifier based on an octagonally polished disc made of a uniform three-dimensional material where the light is coupled in the disk and out of the disk via free space and where the light travels around in the disc close to its rim through reflection on each of the eight facets of the disk, and wherein quasi-phase-matching according to an embodiment of the present invention can be obtained.
Figure 1D:
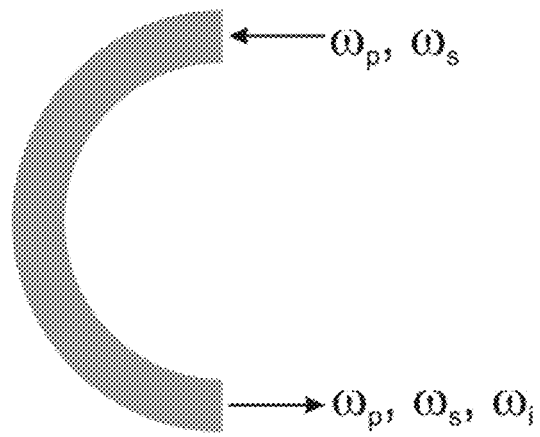
FIG. 1d illustrates a schematic top-view representation of a Raman converter, a parametric converter or a parametric amplifier based on an open, sickle-shaped structure, the contours of which are along a circular ring, and which is made of a uniform three-dimensional material, and wherein quasi-phase-matching according to an embodiment of the present invention can be obtained.
Figure 1E:
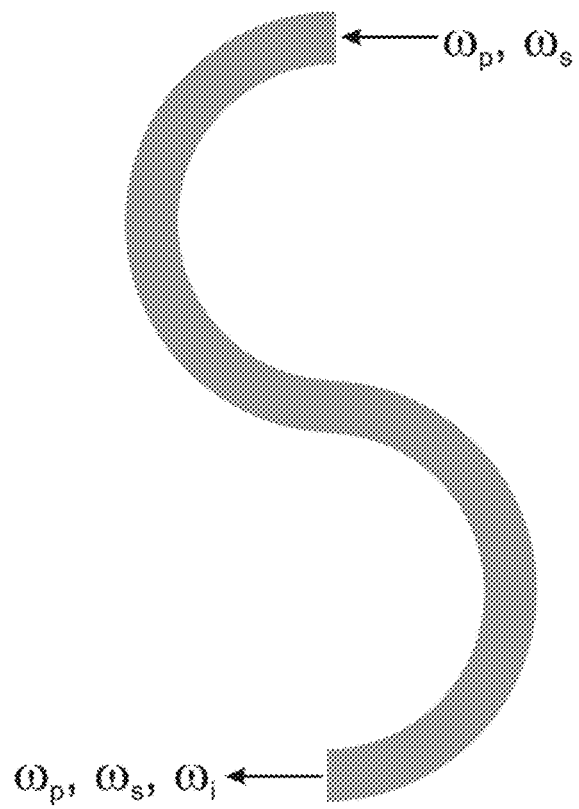
FIG. 1e illustrates a schematic top-view representation of a Raman converter, a parametric converter or a parametric amplifier based on an open, snake-shaped structure, the contours of which are along a circular ring, and which is made of a uniform three-dimensional material, and wherein quasi-phase-matching according to an embodiment of the present invention can be obtained.
Figure 1F:
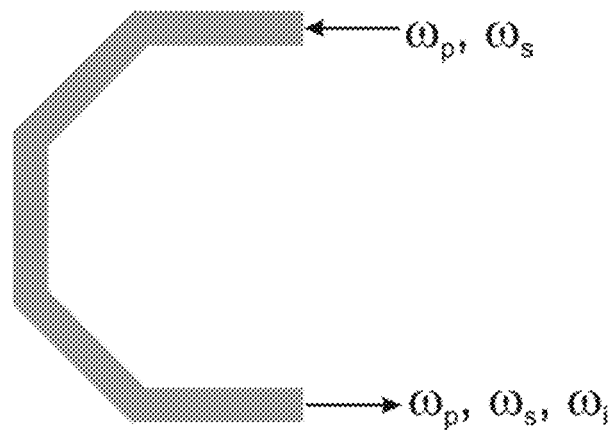
FIG. 1f illustrates a schematic top-view representation of a Raman converter, a parametric converter or a parametric amplifier based on an open, sickle-shaped structure, the contours of which are along an octagon, and which is made of a uniform three-dimensional material, and wherein quasi-phase-matching according to an embodiment of the present invention can be obtained.
Figure 1G:
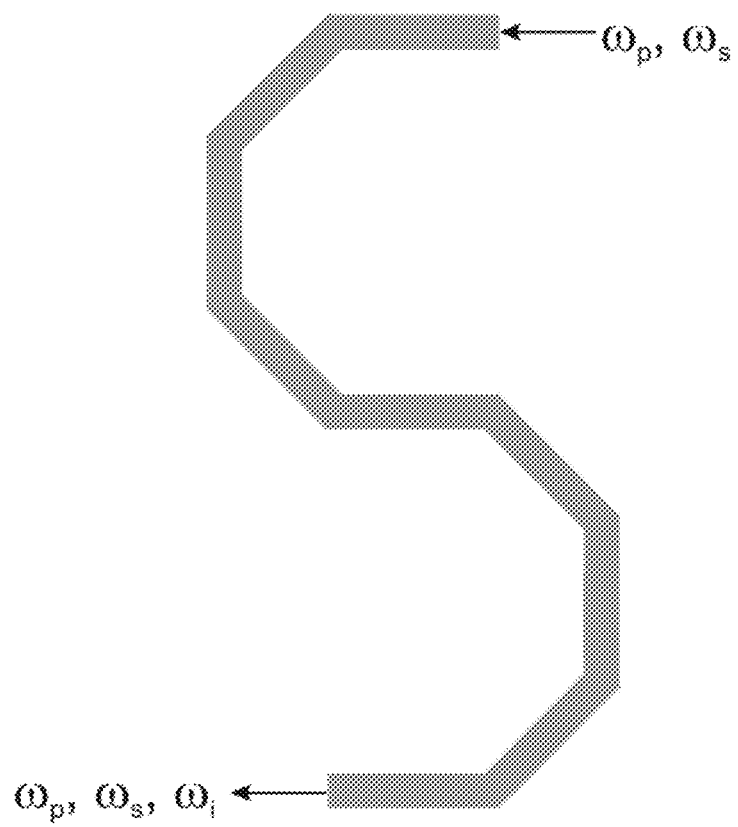
FIG. 1g illustrates a schematic top-view representation of a Raman converter, a parametric converter or a parametric amplifier based on an open, snake-shaped structure, the contours of which are along an octagon, and which is made of a uniform three-dimensional material, and wherein quasi-phase-matching according to an embodiment of the present invention can be obtained.

The drawings are only schematic and are non-limiting. In the drawings, the size of some of the elements may be exaggerated and not drawn on scale for illustrative purposes.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a Raman-active material, reference is made to a material or medium wherein the Raman susceptibility has a non-zero value.

Where in embodiments of the present invention reference is made to a Kerr-nonlinear material or medium, reference is made to a material or medium wherein the Kerr susceptibility has a non-zero value.

Where in embodiments of the present invention reference is made to a quadratically nonlinear material or medium, reference is made to a material or medium wherein the second-order susceptibility has a non-zero value.

Where in embodiments according to the present invention reference is made to a quasi-phase-matched (QPM) nonlinear optical wave mixing process, such as for example QPM SFG, QPM DFG, QPM Raman-resonant FWM or QPM Kerr-induced FWM, reference is made to a nonlinear optical wave mixing process where quasi-phase-matching in embodiments of the present invention is obtained in a non-traditional way, namely using a uniform three-dimensional material which can be covered with a two-dimensional or quasi-two-dimensional material layer. Nonlinear optical wave mixing may encompass for example four wave mixing or three wave mixing. For example, QPM SFG, QPM DFG, QPM Raman-resonant FWM or QPM Kerr-induced FWM can be obtained for any value of the linear phase mismatch $\Delta k_{linear}$. When the value of the linear phase mismatch $\Delta k_{linear}$ for these nonlinear optical processes is negligibly small ($\Delta k_{linear} \approx 0$) and the processes take place in a device that is not designed for QPM operation, the process is called to be perfectly phase-matched (PPM). When the product of the linear phase mismatch and the propagation distance d has an absolute value smaller than pi ($|\Delta k_{linear}| \cdot d < \pi$) and the nonlinear optical process takes place in a device that is not designed for QPM operation, the process is said to feature coherence-length-dependent operation. A process is not referred to as quasi-phase matched (QPM), as perfectly phase-matched (PPM) or as coherence-length dependent (CLD) in case none of the above approaches apply. To understand how PPM operation can be obtained for example for FWM, one needs to take into account that for FWM $\Delta k_{linear}$ can be written as $$\Delta k_{linear} = -\beta_2(\Delta \omega)^2 - \frac{1}{12}\beta_4(\Delta \omega)^4.$$

This relation shows that one can establish PPM operation at large |Δω|—values in e.g. a silicon waveguide by engineering the $\beta_2$ and $\beta_4$-factors, i.e. the dispersion of the silicon waveguide. As the term function of $\beta_4$ in the formula above generally is less important than the term function of $\beta_2$, this dispersion engineering implies that one should establish $\beta_2=0$ at the preferred pump wavelength, which then corresponds to the so-called zero-dispersion wavelength (ZDW).

Where in embodiments of the present application reference is made to a bent structure, reference is made to a non-straight structure. The latter also may be expressed as a structure wherein the propagation direction of propagating radiation is altered. The latter may for example be a curved structure, such as for example a circular, elliptical, or spiral structure, or a broken structure, such as for example an octagonal shaped structure or a rectangular shaped structure. In addition thereto the bent structure also encompasses the situation whereby the three dimensional material is as such not shaped but has a structure, e.g. a crystallographic structure, allowing to bend radiation when it is passing in the structure.

Where in embodiments of the present invention reference is made to a radiation propagation portion, reference may be made to a medium that allows propagation of radiation, and that for example can be a waveguide or a medium that allows free-space radiation propagation.

In a first aspect, the present invention relates to methods and systems for performing conversion or amplification using QPM nonlinear optical processes, more particularly nonlinear optical wave mixing processes. Such nonlinear optical processes encompass e.g. four wave mixing processes as well as three wave mixing processes such as SFG, DFG, Raman-resonant FWM and Kerr-induced FWM. The methods and systems for performing conversion or amplification may be methods and systems for performing Raman conversion, for performing parametric conversion or for performing parametric amplification. The system according to embodiments of the present invention comprises a first radiation source for providing a pump radiation beam and a second radiation source for providing a signal radiation beam. The system furthermore comprises a bent structure for receiving the pump radiation beam and the signal radiation beam, wherein a radiation propagation portion, e.g. a waveguide portion of the bent structure is made of a uniform three-dimensional material that can be at least partly covered by a two-dimensional material layer or quasi-two-dimensional material layer. Due to the bending or curvature of the radiation propagation structure, radiation travelling through the bent structure will not see a uniform nonlinear optical susceptibility, but will see a variation therein, even if not only the three-dimensional material is uniform but also the two-dimensional or quasi-two-dimensional nonlinear optical material layer on top is uniform. More particularly, whereas the uniform material has a uniform optical nonlinearity in a laboratory reference system fixed to the system, a variation in the nonlinear susceptibility is present felt by the radiation travelling through the bent structure, depending on the polarization of the radiation and the orientation of the principle crystal axes of the material used.

In other words, the two-dimensional material layer may induce a variation in nonlinear optical susceptibility. According to embodiments of the present invention, the variation may be induced by a configuration as indicated above. In the description and examples indicated below, different embodiments will be more explicitly described, the invention not being limited thereto.

According to embodiments of the present invention, the dimensions of the bent structure are selected taking into account the spatial variation of the susceptibility along the bent structure as experienced by the radiation travelling along the bent structure so that non-traditional QPM SFG, DFG, or FWM is obtained in the bent structure made of a uniform three-dimensional material which can be covered with a two-dimensional or quasi-two-dimensional material layer. The bent structure thus may be any structure allowing to change or alter, e.g. curve, the propagation direction of the radiation, such that a variation in susceptibility is felt by the radiation. In advantageous embodiments, the bent structure may be a closed structure, such as for example a ring structure or disc structure. Such ring or disc structure may for example be a circular ring, an elliptical ring, an octagonal ring, a rectangular ring, a circular disc, an elliptical disc, an octagonal disc or a rectangular disc and the properties of the closed structure may be selected such that at least one of the radiation beams is enhanced. Alternatively, the structure may be an open structure wherein a change is induced in the propagation direction of the radiation such that a variation in susceptibility is felt by the radiation. An example thereof could be a sickle-shaped structure, a snake-shaped structure, or a spiral-shaped structure, the contours of which are along a circular ring, an octagon, or another type of polygon. A number of particular examples is shown in FIG. 1b to FIG. 1k. The full structure, including the two-dimensional or quasi-two-dimensional material layer positioned on top of the bent structure, is only shown in FIG. 1j and FIG. 1k. The structures shown in FIG. 1a to FIG. 1i are examples of the underlying three-dimensional material structures that also can be used.

As indicated, a dimension of the bent structure is selected so that QPM FWM is obtained in the bent structure made of a uniform three-dimensional material which can be covered with a two-dimensional or quasi-two-dimensional material layer. The typical dimension of a structure may be an average length of a radiation propagation portion, e.g. waveguide portion, of the bent structure, but also may be for example a radius of the bent structure, an average radius of the bent structure, a radius of an inscribed circle or in-circle of the structure, a radius of a circumscribed circle or circumcircle, etc. In some embodiments, a dimension also may be an average radius of curvature. If for example the average length is used, the average length of the radiation propagation part of the bent structure may be in a range between 1μm and 10 cm.

According to embodiments of the present invention, a dimension of the bent structure or more particularly the radiation propagation portion thereof is such that it is substantially inverse proportional with the linear phase mismatch for SFG, DFG or FWM. The linear phase mismatch for SFG equals the pump wavenumber plus the signal wavenumber minus the idler wavenumber, the linear phase mismatch for DFG equals the pump wavenumber minus the signal wavenumber minus the idler wavenumber, and the linear phase mismatch for FWM equals two times the pump wavenumber minus the signal wavenumber minus the idler wavenumber. These linear phase mismatches indicate how fast the dephasing of the different fields first grows and then returns to zero again in a periodic way along the propagation path.

The typical dimension of the bent structure may be inversely proportional to the linear phase mismatch for SFG, DFG or FWM. In other words $$\text{Typical dimension of the bent structure} = f\left(\frac{1}{\Delta k_{linear}}\right)$$

In some embodiments according to the present invention, a closed loop structure is used and the structure is adapted for enhancing at least one and advantageously a plurality or more advantageously all of the radiation beams in the closed loop structure. Nevertheless, also open structures or open loop structures are envisaged. The system furthermore comprises an outcoupling radiation propagation portion, e.g. a waveguide, for coupling out an idler radiation beam generated in the bent structure.

The uniform material used may be a uniform quadratically nonlinear material, a uniform Raman-active and/or uniform Kerr-nonlinear material.

In embodiments of the present invention whereby a bent structure made of a uniform three-dimensional material covered by a two-dimensional or quasi-two-dimensional material is used, different materials can be used. The two-dimensional or quasi-two-dimensional material that may be used may for example be one or a combination of graphene, graphyne, borophene, germanene, silicene, stanine, phosphorene, germanane, nickel HITP, transition metal di-chalcogenides (TMDCs), MXenes or black phosphorus, or topological insulator. These materials have a typical thickness ranging from below 1 nm up to a few nm. The three-dimensional material that may be used may for example be silicon, silicon on insulator, SiN, GaAs, InGaAs, diamond, cadmium telluride, gallium indium phosphide, indium phosphide and other crystals such as $Ba(NO_3)_2$, $CaCO_3$, $NaNO_3$, tungstate crystals, $BaF_2$, potassium titanyl phosphate (KTP), potassium dihydrogen phosphate (KDP), $LiNbO_3$, deuterated potassium dihydrogen phosphate (DKDP), lithium triborate (LBO), barium borate (BBO), bismuth triborate (BIBO), $LiIO_3$, $BaTiO_3$, yttrium iron garnet (YIG) crystals, AlGaAs, CdTe, $AgGaS_2$, $KTiOAsO_4$ (KTA), $ZnGeP_2$ (ZGP), $RBTiOAsO_4$ (RTA)

The structure may be made in a plurality of ways. It may be processed on a substrate, it may be fabricated using different techniques such as CMOS technology, electron beam lithography, photolithography, chemical vapour deposition (CVD), low-pressure chemical vapour deposition (LP-CVD), pulsed laser deposition (PLD), plasma enhanced chemical vapour deposition (PECVD), electrochemical delamination, thermal oxidation, reactive-ion etching, focused ion beam, crystal growth, epitaxial growth, sputtering, flux pulling method from a stoichiometric melt, and polishing.

As indicated above, the system comprises a first and second radiation sources for generating a pump radiation beam and a signal radiation beam. Such radiation sources typically may be lasers, although embodiments of the present invention are not limited thereto. The type of lasers selected may depend on the application. Some examples of lasers that could be used are semiconductor lasers, solid-state lasers, fiber lasers, gas lasers, . . . . The required output power and wavelength of e.g. the pump laser depends on the output that one wants to obtain, e.g. of the output power one expect from the converter or amplifier.

In some embodiments, the system also may comprise a controller for controlling the system, e.g. the first radiation source and the second radiation source, and environmental conditions of the system, so as to be able to slightly tune the system. In one embodiment, a heating and/or cooling means, e.g. heater and/or cooler, may be present for controlling the temperature of the system and in this way also properties of the system. In an advantageous embodiment, the controller may be adapted so that defined conditions for obtaining cavity-enhanced quasi-phase-matched SFG, cavity-enhanced quasi-phase-matched DFG, or cavity-enhanced quasi-phase-matched FWM, such as a well-controlled temperature, are maintained in the system. Such a controller may operate in an automated and/or automatic way. The controller may be implementing predetermined rules or a predetermined algorithm for controlling the system, or it may be adapted for using a neural network for controlling the system. The controller may comprise a memory for storing data and a processor for performing the steps as required for controlling. The controller may be computer implemented. Whereas in the present aspect, the controller is described as a component of the system, in one aspect, the present invention also relates to a controller as such for performing a method of controlling a system for operating in quasi-phase-matched SFG conditions, quasi-phase-matched DFG conditions, or quasi-phase-matched FWM conditions.

In some embodiments, the system also may comprise a feedback system, providing parameters for checking whether the appropriate conditions are fulfilled and for reporting corresponding information. Such information may for example be transferred to the controller and used by the controller for adjusting or correcting the conditions.

In some embodiments, the resonator, converter or amplifier is adapted for providing a given polarization mode. It thereby is an advantage that no filter means is required for obtaining the polarization mode, as the polarization mode is not altered by the structure.

By way of illustration and for the ease of explanation, embodiments of the present invention not being limited thereto, some features and aspects will now further be described with reference to QPM Raman-resonant FWM and to QPM Kerr-induced FWM in a circular ring structure, and with reference to QPM SFG and QPM DFG in a spiral structure. These provide, without embodiments of the present invention being bound by theory, a possible explanation of the features of the obtained structures.

QPM Raman-resonant FWM and QPM Kerr-induced FWM is discussed in a three-dimensional (100) grown ring-shaped silicon-on-insulator (SOI) waveguide, which in embodiments of the present invention can be covered by a layer of a two-dimensional or quasi-two-dimensional material as described above. The shape of the bent structure as used in embodiments according to the present invention is illustrated by way of example in FIG. 1a. The three-dimensional material used has a uniform Raman-active medium for the Raman-resonant FWM process and a uniform Kerr-nonlinear medium for Kerr-induced FWM process, with respect to a laboratory reference system coupled to the system. However, as TE-polarized pump, signal, and idler waves propagate along the ring, with their polarization always perpendicular to their local direction of propagation, the fourth rank Raman tensor and the fourth rank Kerr tensor, that are uniform in the laboratory frame, are position dependent in a reference frame defined by the direction of propagation and the polarization. This leads to a spatial periodic variation of the Raman susceptibility and of the Kerr susceptibility around the ring, and this variation can be used to design a ring with QPM Raman-resonant FWM or a ring with QPM Kerr-induced FWM. Taking into account that the variation of the Raman susceptibility and of the Kerr susceptibility as experienced by the TE-polarized fields in the (100) grown silicon ring is proportional to $\cos^2(2\theta)$ with θ defined as in FIG. 1a, the condition for QPM Raman-resonant FWM in the ring or the condition for QPM Kerr-induced FWM in the ring is given by $$R = s \frac{1}{\Delta k_{linear}} \tag{1a}$$

where s=±4 so that R has a positive value, and R is the ring radius in case of a circular ring. Important to know is that even if this quasi-phase-matching condition is not exactly fulfilled, for example due to small deviations of R, the quasi-phase-matching efficiency will still be high.

It is to be noticed that this approach can also be used for any other Raman-active medium with the same crystal symmetry as silicon, for any other Kerr-nonlinear medium with the same crystal symmetry as silicon, and for some Raman-active media and/or Kerr-nonlinear media with a crystal symmetry similar to that of silicon. Hence, many crystals can be used, some examples of which are SiN, germanium, GaAs, InGaAs, diamond, cadmium telluride, gallium indium phosphide, indium phosphide, $Ba(NO_3)_2$, $CaCO_3$, $NaNO_3$, tungstate crystals, $BaF_2$, potassium titanyl phosphate (KTP), potassium dihydrogen phosphate (KDP), $LiNbO_3$, deuterated potassium dihydrogen phosphate (DKDP), lithium triborate (LBO), barium borate (BBO), bismuth triborate (BIBO), $LiIO_3$, $BaTiO_3$, yttrium iron garnet (YIG) crystals.

In addition to achieving QPM FWM, one wants to design the ring so that all waves involved in the Raman-resonant FWM process and in the Kerr-induced FWM process are resonantly enhanced in the ring; this will lead to high intensities in the ring even for low intensity input waves. Complete resonant enhancement occurs when the values of $k_{\{p,s,i\}}R$ correspond to integer numbers. It is remarked that if $k_pR$ and $k_sR$ have integer values and if in addition the quasi-phase-matching condition expressed above is fulfilled, then $k_iR$ will also correspond to an integer number. As such, whereas for ring converters based on the principle of "coherence-length-dependent (CLD) operation" it is not possible to have the pump, signal and idler waves all at ring resonances in the presence of a non-zero $\Delta k_{linear}$, such a triply-resonant condition at a non-zero $\Delta k_{linear}$ does become possible when using QPM operation. It is also noted that in most cases the free spectral range of the ring will be quite small, so that a small temperature tuning will suffice to guarantee that the pump and signal waves, and automatically also the idler wave, are at ring resonances. Using temperature tuning, one can also compensate for phase-shifting phenomena that might occur in the silicon medium, such as self- and cross-phase modulation.

Figure 1H:
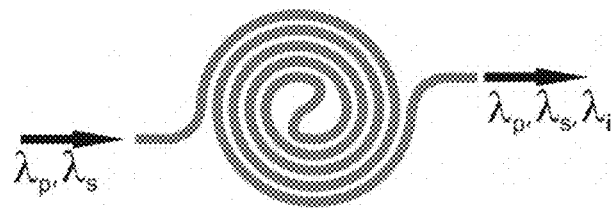
FIG. 1h illustrates a schematic top-view representation of a Raman converter, a parametric converter or a parametric amplifier based on an open, double-spiral-shaped structure (not drawn to scale), the contours of which are along a circular ring, and which is made of a uniform three-dimensional material, and wherein quasi-phase-matching according to an embodiment of the present invention can be obtained.
Figure 1I:
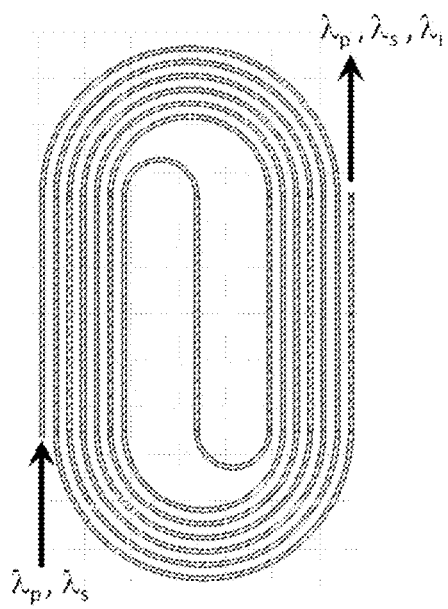
FIG. 1*i* illustrates a schematic top-view representation of a Raman converter, a parametric converter or a parametric amplifier based on an open, double-spiral-shaped structure, the contours of which are along a rectangle, and which is made of a uniform three-dimensional material, and wherein quasi-phase-matching according to an embodiment of the present invention can be obtained.

QPM SFG and DFG are discussed in a spiral-shaped waveguide made of a uniform three-dimensional material which in embodiments of the present invention can be covered by a layer of a two-dimensional or quasi-two-dimensional material as described above. Different bent structures as can be used in embodiments of the present invention are shown in FIG. 1h to 1i. In these drawings, different spiral shapes are shown, the spiral shaped structure in one example being more circular shaped and in another example being more rectangular shaped.

Figure 1J:
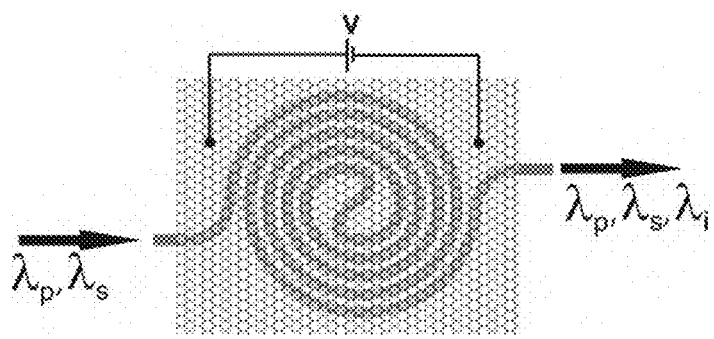
FIG. 1*j* illustrates a schematic top-view representation of a parametric converter or a parametric amplifier based on an open, double-spiral-shaped structure (not drawn to scale), the contours of which are along a circular ring and that is made of a uniform three-dimensional material and fully covered with a uniform two-dimensional or quasi-two-dimensional material layer through which a current is flowing, and, and wherein quasi-phase-matching according to an embodiment of the present invention can be obtained.

A first exemplary embodiment of the present invention is shown in FIG. 1j, whereby the spiral-shaped waveguide is a spiral-shaped silicon-on-insulator (SOI) waveguide covered by a uniform sheet of a two-dimensional or quasi-two-dimensional material, in the present example graphene, through which an electric current is flowing. Because of the electric current, the graphene top sheet acquires a strong second-order nonlinearity, and the waves propagating in the spiral-shaped waveguide feel the presence of this second-order nonlinearity due to the interaction of their evanescent tails with the graphene top layer. This second-order nonlinearity is uniform with respect to a laboratory reference system coupled to the system. However, as TE-polarized pump, signal, and idler waves propagate along the spiral-shaped SOI waveguide, with their polarization always perpendicular to their local direction of propagation, the second-order nonlinearity tensor, that is uniform in the laboratory frame, is position dependent in a reference frame defined by the direction of propagation and the polarization. This leads to a spatial periodic variation of the second-order susceptibility around the spiral, and this variation can be used to design a spiral with QPM SFG or a spiral with QPM DFG. Taking into account that the variation of the second-order susceptibility as experienced by the TE-polarized fields is proportional to $\cos(\theta)$ with $\theta$ defined as the angle between the local field polarization and the direction of the current flow, the condition for QPM SFG in the ring or the condition for QPM DFG in the ring is given by $$R = s \frac{1}{\Delta k_{linear}} \tag{1b}$$

where s=±1 so that R has a positive value, and R is the average radius of the spiral. Important to know is that even if this quasi-phase-matching condition is not exactly fulfilled, for example due to small deviations of R, the quasi-phase-matching efficiency will still be high.

It is to be noticed that this approach can also be used for any other quadratically nonlinear material with the same crystal symmetry as graphene through which an electric current is flowing, and for some quadratically nonlinear media with a crystal symmetry similar to that of graphene through which an electric current is flowing. Hence, many materials can be used, some examples of which are graphyne, borophene, germanene, silicene, stanine, phosphorene, metals, 2D supracrystals, hexagonal boron nitride, germanane, nickel HITP, transition metal di-chalcogenides (TMDCs), MXenes or black phosphorus, topological insulator, SiN, GaAs, InGaAs, $Ba(NO_3)_2$, $CaCO_3$, $NaNO_3$, tungstate crystals, $BaF_2$, potassium titanyl phosphate (KTP), potassium dihydrogen phosphate (KDP), $LiNbO_3$, deuterated potassium dihydrogen phosphate (DKDP), lithium triborate (LBO), barium borate (BBO), bismuth triborate (BIRO), $LiIO_3$, $BaTiO_3$, yttrium iron garnet (YIG) crystals, AlGaAs, CdTe, $AgGaS_2$, $KTiOAsO_4$ (KTA), $ZnGeP_2$ (ZGP), $RBTiOAsO_4$ (RTA).

The amplifier or converter according to embodiments of the present invention may also provide the functionality of a resonator, embodiments not being limited thereto.

In a second particular embodiment, similar bent structures as indicated above can be used, but the two-dimensional or quasi-two-dimensional cover layer is not fully covering the bent structure but is patterned. The patterning may be adapted such that periodic variations in the nonlinear optical susceptibility are introduced. The patterning may for example be a pie-shaped patterning. The patterning periodicity should be chosen proportional to the radius of the bent structure, with the radius chosen inversely proportional to the linear phase mismatch.

In a third particular embodiment, similar bent structures as indicated above can be used, whereby the two-dimensional or quasi-two-dimensional cover layer is fully covering the bent structure but the covering layer is locally modified chemically or electrically such that the properties of the covering layer show a spatial variation, resulting in periodic variations in the nonlinear optical susceptibility that are introduced for the radiation. This equally results in the possibility of conversion or amplification using a quasi-phase matched nonlinear optical wave mixing. The electrical modification may comprise applying a voltage on the cover layer.

By way of illustration, embodiments of the present invention not being limited thereto, the present invention now will be further illustrated with reference to particular embodiments, illustrating some features and advantages of embodiments according to the present invention. Whereas in the first two embodiments, principles are described for non-covered bent structures made of uniform three-dimensional materials, the principles and features illustrated are equally applicable to the situation of a bent structure made of a uniform three-dimensional material covered with a layer of two-dimensional or quasi-two-dimensional material, e.g. as discussed in the above described embodiments.

Without wishing to be bound by theory, first a mathematical suggestion of how the principles of embodiments of the present invention could be explained also is provided.

In a particular embodiment, reference is made to a QPM Raman-resonant FWM system based on a silicon ring resonator. The system of the example shown thereby is not only adapted for QPM Raman-resonant FWM, but also illustrates that advantageously use can be made of cavity enhancement effects and of the free choice of the waveguide geometry when using quasi-phase matching.

In this embodiment two comparisons will be made between QPM silicon Raman ring converters and PPM Raman converters. To do this, first a modeling formalism for Raman converters is introduced.

Without restricting the general validity of the results, focus is made on quasi-continuous-wave operation and on operation at exact Raman resonance. Assuming that $n_k/n_l \approx 1$ (for k,l=p,s,i) and that Kerr-induced FWM in silicon is negligible at the considered working point of exact Raman resonance, the equations expressing the steady-state spatial variation of the slowly-varying pump, signal and idler field amplitudes $A_p(\zeta)$, $A_s(\zeta)$, $A_i(\zeta)$ in the SOI ring Raman converter are given by $$\frac{\partial A_p}{\partial \zeta} = \frac{\omega_p}{\omega_s}\frac{g_R}{2}\rho(\theta)[|A_i|^2 A_p - |A_s|^2 A_p] - \gamma_p A_p, \quad (2)$$

$$\frac{\partial A_s}{\partial \zeta} = \frac{g_R}{2}\rho(\theta)[|A_p|^2 A_s + A_p^2 A_i^* e^{i\Delta k_{linear}\zeta}] - \gamma_s A_s, \quad (3)$$

$$\frac{\partial A_i}{\partial \zeta} = -\frac{\omega_i}{\omega_s}\frac{g_R}{2}\rho(\theta)[|A_p|^2 A_i + A_p^2 A_s^* e^{i\Delta k_{linear}\zeta}] - \gamma_i A_i, \quad (4)$$

where $\zeta=R\theta$ and $A_{\{p,s,i\}}$ is normalized such that $|A_{\{p,s,i\}}|^2$ corresponds to intensity. The function $\rho(\theta)$ will be specified further on. The terms containing $e^{i\Delta k_{linear}\zeta}$ express the Raman-resonant FWM interaction, and the terms proportional to $|A_{\{p,s\}}|^2 A_{\{s,p\}}$ and $|A_{\{p,i\}}|^2 A_{\{i,p\}}$ describe two accompanying Raman processes. The coefficient $g_R$ is the Raman gain coefficient of silicon and $\gamma_{\{p,s,i\}}$ describe the optical losses in the SOI waveguide. At near-infrared operation wavelengths, which are considered in this embodiment for the Raman converters, the latter receive contributions from linear propagation losses, two-photon absorption (TPA) and TPA-induced free carrier absorption (FCA). At the entry point of light into the ring from the channel one has $\theta=0$ (see FIG. 1). Coupling from the channel to the ring is described in the usual way, $$\begin{pmatrix} A_{j2} \\ A_{j3} \end{pmatrix} = \begin{pmatrix} \sigma_j & i\kappa_j \\ i\kappa_j & \sigma_j \end{pmatrix}\begin{pmatrix} A_{j1} \\ A_{j4}\exp(ik_jL) \end{pmatrix}, \quad (5)$$

with j=p,s,i, with the positions of the fields (1)-(4) indicated in FIG. 1, and with $L=2\pi R$. One can consider real-valued coupling constants $\sigma_j$, $\kappa_j$ that satisfy the relation $\sigma_j^2=\kappa_j^2=1$.

One now can solve numerically equations (2) to (5) to make two comparisons: On one hand, to illustrate the effect of cavity enhancement in the QPM silicon Raman ring converters, a concrete QPM Raman ring converter configuration and a theoretical one-dimensional PPM Raman converter without losses will be compared. On the other hand, to illustrate the effect of having a free choice for the waveguide geometry in QPM silicon Raman ring converters, a concrete QPM Raman ring converter configuration and a concrete PPM Raman ring converter, both with losses also will be compared.

For the first exemplary comparison in the first embodiment, one considers for the QPM Raman ring converter configuration a TE-polarized pump input and a TE-polarized Stokes-shifted signal input with a frequency difference corresponding to the exact Raman resonance: $\omega_p=1.22\times10^{15}$ rad/s ($\lambda_p=1.55$ μm), $\omega_s=1.12\times10^{15}$ rad/s ($\lambda_s=1.686$ μm). This leads to a generated idler wave with angular frequency $\omega_i=1.32\times10^{15}$ rad/s ($\lambda_i=1.434$ μm). The system may have a structure as illustrated in FIG. 1. At these near-infrared operation wavelengths, the Raman gain coefficient $g_R$ of silicon equals $20\times10^{-9}$ cm/W. As there are no dispersion engineering constraints for the QPM converter, one is free to choose the waveguide geometry for both the ring and the channel. When taking a nanowire of 300-nm height and 500-nm width, the free carrier lifetime $\tau_{eff}$ will be as short as 500 ps. Because of the oblong core of the nanowire, TM fields generated through spontaneous Raman scattering in the ring are for the large part coupled out after each roundtrip, and cannot build up in the ring. In case an oxide cladding is used for the nanowire, the dispersion $D=-2\pi c \beta_2/\lambda^2$ in the nanowire for the TE-polarized pump field at $\lambda_p=1.55$ μm equals 1000 ps/(nm*km), yielding $\Delta k=2k_p-k_s-k_a=122$ cm$^{-1}$. For s=+1, it is found that the condition (1) is met for R=328 μm, corresponding to a ring circumference L of 2.1 mm. For the remaining device parameters the following values were taken: $K_p^2=K_s^2=K_i^2=0.05$ (in line with reported values), waveguide modal area $A_{eff}=0.20$ μm$^2$, linear loss α=1 dB/cm, two-photon absorption coefficient $\beta=0.7\times10^{-11}$ m/W, free carrier absorption efficiency $\varphi=6\times 10^{-10}$, $I_{p,in}=1\times10^{11}$ W/m$^2$, $I_{s,m}=1\times10^8$ W/m$^2$, and $P_r(\theta)\sim\cos^2(2\theta)$ along the ring as specified earlier on. One then can numerically solve equations (2) to (5) for the QPM ring Raman converter. The solid lines in FIG. 2 parts (a)-(c) show the steady-state distributions along the ring of the pump, signal and idler intensities, respectively. Using equation (5), one finds from FIG. 2(c) that $I_{i,out}^{ring}=2.15\times10^8$ W/m$^2$. The conversion efficiency thus is larger than unity i.e. larger than 0 dB. For comparison, a one-dimensional PPM Raman converter with equal length would yield $I_{i,out}^{1D}=(\omega_i/\omega_s)^2(g_r/2)^2 I_{p,in}^2 I_{s,in} L^2=6.13\times10^4$ W/m$^2$. The enhancement factor $I_{i,out}^{ring}/I_{i,out}^{1D}$ for the QPM ring converter with losses included compared to the one-dimensional PPM converter without losses thus equals 3.5×10³, which is very large.

In conclusion, the idler output intensity of a QPM silicon ring Raman converter can easily become 3×10³ times larger than that of a one-dimensional PPM Raman converter of equal length. Taking into account the quadratic dependence of the latter's output on the pump input, this also implies that the QPM ring Raman converter needs a 50 times smaller pump input intensity than the one-dimensional PPM Raman converter to produce the same idler output. Furthermore, signal-to-idler conversion efficiencies larger than unity can be obtained using relatively low pump input intensities. These improvements in conversion performance substantially expand the practical applicability of Raman converters in different application domains.

Figure 2:
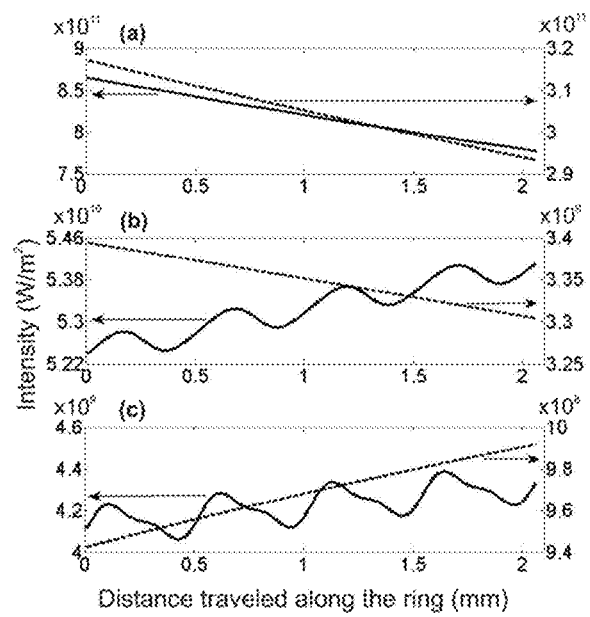
FIG. 2 illustrates (a) pump, (b) signal, (c) idler intensities in a ring Raman converter with the intensity values at a distance of 0 mm (2.1mm) corresponding to $|A_3|^2(|A_4|^2)$ in FIG. 1*a*, as can be obtained in an embodiment according to the present invention. The solid and dashed lines correspond to the quasi-phase-matched Raman converter pumped with 20 mW and to the perfectly phase-matched Raman converter pumped with 5 mW, respectively.
Figure 3:
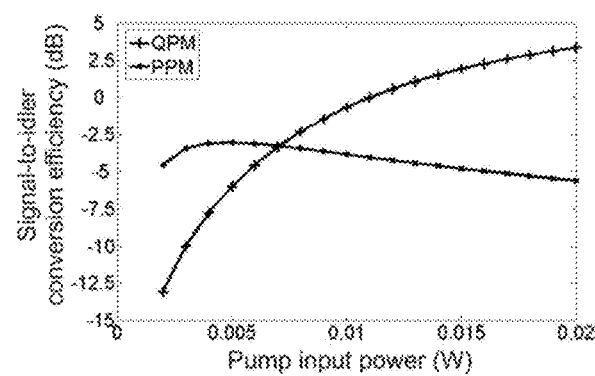
FIG. 3 illustrates the signal-to-idler conversion efficiency of the quasi-phase-matched ring Raman converter and of the perfectly phase-matched ring Raman converter as a function of pump input power.

For the second comparison in the first embodiment, the same QPM Raman ring converter configuration is considered as described above. Instead of comparing it to a theoretical one-dimensional PPM Raman converter without losses as was done above, it is compared to a concrete PPM ring Raman converter with losses included and where $\Delta k_{linear}=0$ is obtained by dispersion engineering the nanowire. For the latter device, the same parameter values are adopted as for the QPM converter described above, including L=2.1 mm and $K_p^2=K_s^2=K_i^2=0.05$, except for the following: $\Delta k_{linear}=0$ cm$^{-1}$, $\rho_R(\theta)=1$, and $\tau_{eff}=3$ ns. Again one assumes all three waves to be at ring resonances. Now one can numerically solve equations (2)-(5) for both Raman converter configurations, while assuming a signal input power of 20×10$^{-6}$ W, corresponding to $I_{s,in}=1\times10^8$ W/m², and while varying the pump input power between 2 mW and 20 mW in steps of 1 mW this corresponds to $I_{p,in}$ ranging from 1×10$^{10}$ W/m² tp 1×10$^{11}$ W/m² steps of 0.5×10$^{10}$ W/m². The reason for choosing a variable pump input is that for the PPM converter with large $\tau_{eff}$ the nonlinear losses will become significant already at low pump powers, whereas for the QPM converter with small $\tau_{eff}$ the onset of nonlinear losses will occur at higher pump powers. For the pump power levels of 20 mW (5 mW), the steady-state distributions along the ring of the pump, signal and idler intensities in the QPM (PPM) converter are represented by the solid (dashed) lines in FIG. 2(a)-(c). FIG. 3 shows the steady-state conversion efficiencies $I_{i,out}/I_{s,in}$ at the different pump levels for the QPM and PPM devices. FIG. 3 shows that at pump input powers up to 7 mW the PPM CARS converter has higher conversion efficiencies than the QPM CARS device, whereas for higher pump powers the QPM converter outperforms the PPM converter. This can be explained as follows: At very low pump powers the nonlinear losses in both converter types are low, and so the operation point is situated quite close to the lossless, small-signal regime, where the PPM converter performs much better than its QPM counterpart. Starting from pump powers of a few mW, however, the PPM converter, which exhibits a relatively large free carrier lifetime, is subjected to substantial pump-power-dependent nonlinear losses, which is not the case for the QPM converter. As a result, the conversion efficiency of the PPM device saturates at a value of—3 dB for a pump power of 5 mW, whereas that of the QPM converter continues to grow for increasing pump power, exceeding a value of +3 dB at a pump power level of 20 mW. Hence, in case no carrier-extracting p-i-n diodes are used, the QPM converter can outperform the PPM converter by as much as 6 dB. Also, FIG. 3 shows that starting from pump powers as low as 11 mW the QPM device can establish conversion efficiencies larger than 0 dB. Taking into account that the best-performing silicon Raman converter demonstrated thus far is a channel waveguide converter that, when excited with extremely high-energy pump pulses with peak intensities of 2×10$^{13}$ W/m², produces a signal-to-idler conversion efficiency of 58% or −2.4 dB, it is found that the QPM ring converter presented here could considerably outperform this record demonstration both in terms of conversion efficiency and in terms of minimizing the required pump input intensity. This is partially due to the fact that the QPM ring device can benefit from cavity enhancement in the ring which the channel waveguide converter cannot, and partially because of the non-traditional quasi-phase-matching mechanism itself, which appears in the ring made of uniform silicon provided that the ring circumference is properly chosen.

It is pointed out that for the QPM device the TPA losses will also undergo a periodic variation proportional to (0.88+0.12 cos²(2θ)) in the ring, but as the varying part of the TPA losses is small compared to the constant part, this variation only has a small influence, as simulations that are not presented here in detail confirm. In the second embodiment it will be shown, however, that an equally small variation of the effective Kerr nonlinearity γ does suffice to effectively establish quasi-phase-matching in a parametric converter, since this variation establishes a phase effect rather than an intensity loss effect.

Figure 4:
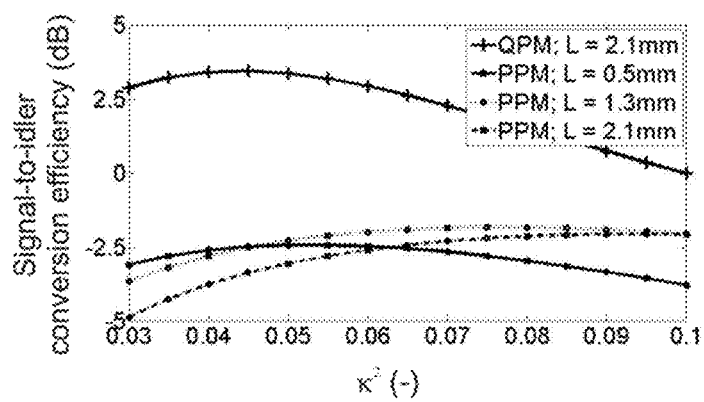
FIG. 4 illustrates the signal-to-idler conversion efficiency of the quasi-phase-matched ring Raman converter and of the perfectly phase-matched ring Raman converter with different ring circumferences as a function of $K_p^2=K_s^2=K_i^2$.

One might question whether the coupling coefficients $K_p^2=K_s^2=K_i^2=0.05$ assumed here yield the highest conversion efficiencies for the QPM and PPM Raman devices, and whether the ring circumference L=2.1 mm calculated for the QPM converter is the most optimal ring circumference for the PPM converter as well. When varying the coupling coefficients using intermediate steps of 0.005 for the QPM converter with L=2.1 mm and for the PPM converter with different ring circumferences (see FIG. 4), it is indeed observed that for both converters the coupling coefficients have a significant influence on the attainable conversion efficiencies and that for the PPM converter the value of the ring circumference is important as well. FIG. 4 shows that the QPM converter performs best for the coupling coefficients $K_p^2=K_s^2=K_i^2=0.045$—a value close to the value of 0.05 which was already chosen for the illustration and that the PPM converter features the highest performance for $K_p^2=K_s^2=K_i^2=0.075$ and L=1.3 mm. It is pointed out that the maximal conversion efficiency of the PPM converter is only 1 dB higher than the efficiency obtained earlier on for $K_p^2=K_s^2=K_i^2=0.05$ and L=2.1 mm, so the general performance tendencies of the PPM converter as outlined above remain valid.

In conclusion for the present examples, since for a QPM Raman ring converter the nanowire geometry can be chosen such that the FCA losses are minimal, the device should, when considering actual converter operation with losses included, substantially outperform a PPM Raman ring converter based on a dispersion-engineered nanowire of the type presented earlier in the literature. It is remarked that the latter comparison holds provided that both devices are fabricated using the low-cost intrinsic silicon-on-insulator platform without carrier-extracting p-i-n diodes. Furthermore, the QPM Raman ring converter should significantly outperform the best-performing silicon Raman converter demonstrated thus far, as it is able to establish signal-to-idler conversion efficiencies larger than 0 dB at modest pump powers. Such high performance, combined with the fact that no dispersion engineering is required and that the device can be realized in the low-cost intrinsic silicon-on-insulator platform, show the potentialities of QPM Raman wavelength conversion in silicon rings.

In another particular embodiment, reference is made to a QPM Kerr-induced FWM system based on a silicon ring resonator. The system of the example shown thereby is not only adapted for QPM Kerr-induced FWM, but also illustrates that advantageously use can be made of cavity enhancement effects and that efficient conversion can be established for a large pump-signal frequency shift in a spectral domain where the dispersion characteristics of the silicon waveguide are not optimally engineered for PPM Kerr-induced FWM. As mentioned above, the condition for QPM Kerr-induced FWM in the ring is given by $$R = s \frac{1}{\Delta k_{linear}}$$

where $s=\pm 4$ so that R has a positive value, and R is the ring radius in case of a circular ring. Taking into account that $\Delta k_{linear} \approx -\beta_2(\Delta\omega)^2$, one finds that this quasi-phase-matching condition can be fulfilled even if the pump-signal frequency shift is large and if one works in a spectral domain where the dispersion characteristics of the silicon waveguide are not optimally engineered for PPM Kerr-induced FWM. Furthermore, the relation $\Delta k_{linear} \approx -\beta_2(\Delta\omega)^2$ also indicates that, for a given value of R, the quasi-phase-matching condition (1) can be fulfilled for different combinations of $\beta_2$ and $\Delta\omega$. Thus, for a ring resonator with a ring radius R and with a properly designed, non-constant dispersion profile, one can convert via QPM Kerr-induced FWM a fixed signal frequency $\omega_s$ to various idler frequencies $\omega_i$ spread over the near- and mid-infrared range, by changing only the pump frequency $\omega_p$. Finally, if R is chosen to be small to keep the device compact, one finds that $\Delta\omega$ can be large also if $\beta_2$ is large.

As also mentioned above, the quasi-phase-matching condition expressed above complies with the condition for having the pump field, the signal field and the idler field at ring resonances. The fact that efficient non-traditional quasi-phase-matching can be combined with cavity enhancement for all three fields in the ring resonator is an important advantage, since for Kerr-induced FWM with "phase-matched operation" one can obtain cavity enhancement for all three fields only if the pump wavelength is close to the ZDW, i.e. only if one has PPM operation. Otherwise, one has CLD operation in a doubly-resonant condition rather than in a triply-resonant condition. It also can be remarked that, for QPM Kerr-induced FWM, the varying Kerr susceptibility in the ring does not reach zero as minimal value, which is not ideal. However, since it can be combined with cavity enhancement for all three fields also if the GVD at the pump wavelength has a large absolute value and/or the frequency difference between the pump and signal is large, QPM Kerr-induced FWM can in those circumstances establish efficiencies that are relatively high compared to the efficiencies achieved with CLD Kerr-induced FWM.

In this embodiment, two comparisons will be made between QPM ring-based parametric converters and CLD ring-based parametric converters in a spectral domain where the dispersion characteristics of the silicon waveguide are not optimally engineered for PPM Kerr-induced FWM. A one-dimensional CLD parametric converter is not explicitly considered in this comparison to demonstrate the effect of the cavity enhancement of the QPM ring-based parametric converter, as this would yield results along the same lines as those obtained for the first comparison in the previous embodiment on Raman converters. To compare QPM ring-based parametric converters and CLD ring-based parametric converters, a modeling formalism for parametric converters is first introduced. Without restricting the general validity of the results, focus is made on (quasi-)continuous-wave operation. Assuming that $n_k/n_l \approx 1$ (for k,l=p,s,i), the equations expressing the steady-state spatial variation of the slowly-varying pump, signal and idler field amplitudes $A_p(\zeta)$, $A_s(\zeta)$, $A_i(\zeta)$ in the parametric converter are given by $$\frac{\partial A_p}{\partial \zeta} = \qquad\qquad\qquad\qquad\qquad (6)$$
$$i\gamma(\theta)[|A_p|^2 + 2|A_s|^2 + 2|A_i|^2]A_p + 2i\gamma(\theta)A_p^* A_s A_i e^{-i\Delta k_{linear}\zeta} - \Gamma_p A_p,$$

$$\frac{\partial A_s}{\partial \zeta} = i\gamma(\theta)[|A_s|^2 + 2|A_p|^2 + 2|A_i|^2]A_s + i\gamma(\theta)A_p^2 A_i^* e^{i\Delta k_{linear}\zeta} - \Gamma_s A_s, \qquad (7)$$

$$\frac{\partial A_i}{\partial \zeta} = i\gamma(\theta)[|A_i|^2 + 2|A_p|^2 + 2|A_s|^2]A_i + i\gamma(\theta)A_p^2 A_s^* e^{i\Delta k_{linear}\zeta} - \Gamma_i A_i. \qquad (8)$$

where $\zeta=R\theta$, $\gamma(\theta)=n_2^0 \xi_K \rho(\theta)(\omega_p/c)$ is the effective nonlinearity, $n_2^0$ is the Kerr-nonlinear refractive index along the [011] direction, $\xi_K=5/4$, and $A_{\{p,s,i\}}$ is normalized such that $|A_{\{p,s,i\}}|^2$ corresponds to intensity. The function $\rho(\theta)$ will be specified further on. The first terms containing the square brackets at the right hand side of Eqs. (6)-(8) correspond to Kerr-induced self- and cross-phase modulation, and the terms containing $e^{i\Delta k_{linear}\zeta}$ express the actual Kerr-induced FWM interaction. The coefficients $\Gamma_{\{p,s,i\}}$ represent the optical losses in the SOI waveguide. In the near-infrared spectral domain, the latter receive contributions from linear propagation losses, two-photon absorption (TPA) and TPA-induced free carrier absorption, but in the mid-infrared spectral domain, $\Gamma_{\{p,s,i\}}$ only receives contributions from linear propagation losses. At the entry point of light into the ring from the channel one has $\theta=0$ (see FIG. 1). Coupling from the channel to the ring is described in the usual way, $$\begin{pmatrix} A_{j2} \\ A_{j3} \end{pmatrix} = \begin{pmatrix} \sigma_j & i\kappa_j \\ i\kappa_j & \sigma_j \end{pmatrix} \begin{pmatrix} A_{j1} \\ A_{j4}\exp(ik_j L) \end{pmatrix}, \qquad (9)$$

with j=p,s,i with the positions of the fields (1)-(4) indicated in FIG. 1, and with $L=2\pi R$. One can consider real-valued coupling constants $\sigma_j$, $\kappa_j$ that satisfy the relation $\sigma_j^2+\kappa_j^2=1$.

One now can numerically solve Eqs. (6)-(9) to make two comparisons: a comparison is made between a concrete near-infrared-pumped QPM ring-based parametric converter and a concrete near-infrared-pumped CLD ring-based parametric converter, both for the case that the dispersion characteristics of the silicon waveguide in the near-infrared domain are not optimally engineered for PPM Kerr-induced FWM. On the other hand, a comparison is made between a concrete mid-infrared-pumped QPM ring-based parametric converter and a concrete mid-infrared-pumped CLD ring-based parametric converter, both for the case that the dispersion characteristics of the silicon waveguide in the mid-infrared domain are not optimally engineered for PPM Kerr-induced FWM.

Figure 5:
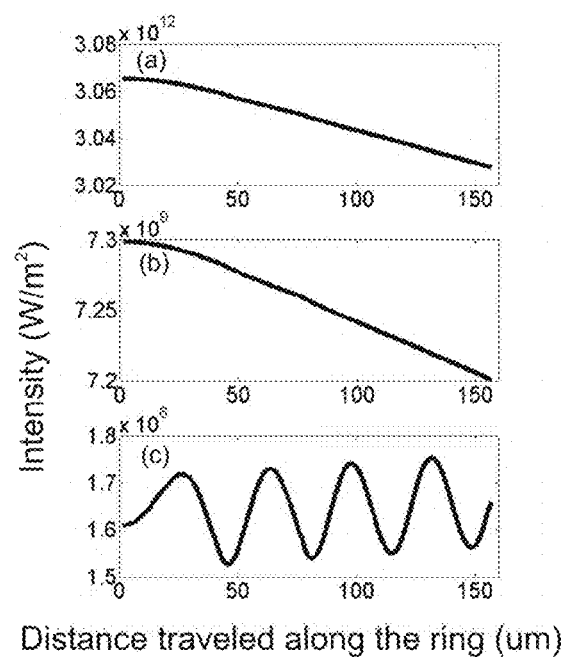
FIG. 5 illustrates (a) pump, (b) signal, (c) idler intensities in a parametric ring converter with $\lambda_p=1.6$ μm with the intensity values at a distance of 0 μm (157 μm) corresponding to $|A_3|^2(|A_4|^2)$ in FIG. 1*a*, as can be obtained in an embodiment according to the present invention.

For the first comparison in the second embodiment, a near-infrared-pumped QPM ring-based parametric converter is initially considered with the following parameter values: $\omega_p=1.18\times 10^{15}$ rad/s ($\lambda_p=1.6$ µm), $\omega_s=1.45\times 10^{15}$ rad/s ($\lambda_s=1.3$ µm), $\omega_i=9.06\times 10^{14}$ rad/s ($\lambda_i=2.08$ µm), $\Delta k_{linear}=1606$ cm$^{-1}$ (corresponding to a dispersion parameter of 1600 ps/(nm*km) at $\lambda_p$), $n_p^0=6.5\times 10^{-18}$ m²/W, $I_{p,in}=6\times10^{10}$ W/m$^2$, $I_{s,in}=1\times10^8$ W/m$^2$, $I_{i,in}=0$ W/m$^2$, waveguide model area A=0.09 µm$^2$, linear loss α=0.9 dB/cm, two-photon absorption coefficient β=0.7×10$^{-11}$ m/W, free carrier absorption efficiency φ=6×10$^{-10}$, effective free carrier lifetime τ$_{eff}$=0.1 ns, κ$_p$=0.14, κ$_s$=0.10, κ$_i$=0.17, and ρ(θ)=(0.88+0.12 cos$^2$(2θ)) along the ring. When implementing the value for Δk$_{linear}$ in the quasi-phase-matching condition with s=+1, one obtains that quasi-phase-matching is obtained for a ring radius R=25 Ξm, which corresponds to a ring circumference of 157 µm. FIG. 5 parts (a)-(c) show the steady-state distributions along the ring of the pump, signal and idler intensities, respectively, as obtained by numerically solving equations (6) to (9) for this converter. Using Eq. (9) one can derive from FIG. 5 part (c) that $I_{i,out}$=5×10$^4$ W/m$^2$. This corresponds to a signal-to-idler conversion efficiency of ×33 dB for this QPM parametric converter with $\lambda_p$=1.6 µm, $\lambda_s$=1.3 µm, $\lambda_i$=2.08 µm. Taking into account that this conversion efficiency is of the same order of magnitude as the conversion efficiencies for CLD Kerr-induced FWM in a silicon ring with the same dispersion parameter but with much smaller pump-signal frequency differences as can be found in literature, one finds that this QPM cavity-enhanced converter has a relatively good performance.

Figure 6:
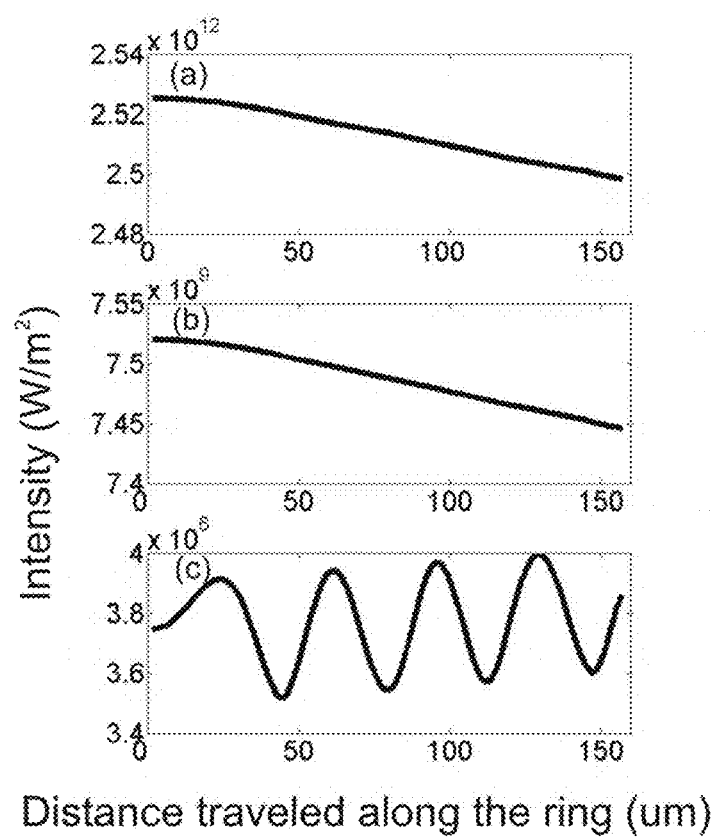
FIG. 6 illustrates (a) pump, (b) signal, (c) idler intensities in a parametric ring converter with $\lambda_p=1.8$ μm with the intensity values at a distance of 0 μm (157 μm) corresponding to $|A_3|^2(|A_4|^2)$ in FIG. 1*a*, as can be obtained in an embodiment according to the present invention.

To demonstrate that also efficiencies higher than ×33 dB could be reached while still pumping in the near-infrared region, one now considers a QPM parametric converter that is pumped at another near-infrared pump wavelength where the nonlinear refractive index is larger than in the previous case. More specifically, a QPM parametric converter is considered with the following parameter values: ω$_p$=1.05×10$^{15}$ rad/s ($\lambda_p$=1.8 µm), ω$_s$=1.32×10$^{15}$ ($\lambda_s$=1.43 µm), ω$_i$=7.76×10$^{14}$ ($\lambda_i$=2.43 µm), Δk$_{linear}$=1606 cm$^{-1}$ (corresponding to a dispersion parameter of 1600 ps/(nm*km) at $\lambda_p$ as in the previous case), $n_2^0$=12×10$^{-18}$ m$^2$/W, two-photon absorption coefficient β=0.5×10$^{-11}$ m/W, and free carrier absorption efficiency φ=(1.8/1.55)$^2$×6×10$^{-10}$. For all other parameters, the same values are taken as in the previous case. FIG. 6 parts (a)-(c) show the steady-state distributions along the ring of the pump, signal and idler intensities, respectively, as obtained by numerically solving Eqs. (6)-(9) for this converter. Using Eq. (9) one can derive from FIG. 6 part (c) that $I_{i,out}$=1.2×10$^5$ W/m$^2$. This corresponds to a signal-to-idler conversion efficiency of −29 dB.

For the second comparison in this embodiment, a mid-infrared-pumped QPM parametric ring converter with a TE-polarized pump input at ω$_p$=8.20×10$^{15}$ rad/s ($\lambda_p$=2.3 µm) and a TE-polarized signal input at ω$_s$=9.87×10$^{14}$ rad/s ($\lambda_s$=1.91 µm) is considered, which feature a large pump-signal angular frequency difference of 2π×26.6 THz. This leads to a generated idler wave at ω$_i$=6.52×10$^{14}$ rad/s ($\lambda_i$=2.89 µm. It is remarked that one of the most interesting application domains for wavelength conversion towards mid-infrared idler wavelengths around 3 µm is spectroscopy, as many substances are highly absorbing in that spectral range. At a pump wavelength of 2.3 µm the Kerr-nonlinear refractive index $n_2^0$ of silicon along the [011] direction equals approximately 8×10$^{-14}$ cm$^2$/W. A nanowire is assumed here which is dispersion-engineered such that its ZDW is situated in the near-infrared, more specifically at 1.5 µm and which features a sufficiently large cross-section to have most of the mode energy at $\lambda_p$=2.3 µm confined in the nanowire core. The nanowire under consideration has a height of 516 nm and a width of 775 nm and has an oxide cladding. For such a waveguide geometry the ZDW is indeed situated at 1.5 µm and that the dispersion D at $\lambda_p$=2.3 µm equals approximately 1200 ps/(nm*km). The latter value yields Δk=2k$_p$−k$_s$−k$_a$=9.40 cm$^{-1}$. For s=+1, it is found that the condition (5) is met for a ring circumference L of 267 µm. The remaining device parameters are: A$_{eff}$=0.4 µm$^2$, α=3 dB/cm, and ρ(θ)=(0.88+0.12 cos$^2$(2θ)) along the ring. In these simulations coupling coefficients are considered ranging from κ$_p^2$=κ$_s^2$=κ$_i^2$=0.06 to a low value of κ$_p^2$=κ$_s^2$κ$_i^2$=0.01, with intermediate steps of 0.005. Since at mid-infrared operation wavelengths the multi-photon absorption and the associated free carrier absorption are negligible in silicon, the free carrier lifetime is not of importance here and the only losses that need to be taken into account in Γ$_{\{p,s,i\}}$ are the linear losses.

Since the same type of nanowire are considered for the mid-infrared-pumped CLD parametric ring converter configuration, for this converter the parameter values are adopted as described above, except that in this case ρ(θ)=1 along the ring. Furthermore, different values are considered for the ring circumferences. It is also pointed out that for the CLD converter it is considered that the pump and signal waves to be at ring resonances and the idler wave to be detuned from ring resonance with the detuning given by k L=−ΔkL+2πs.

Figure 7:
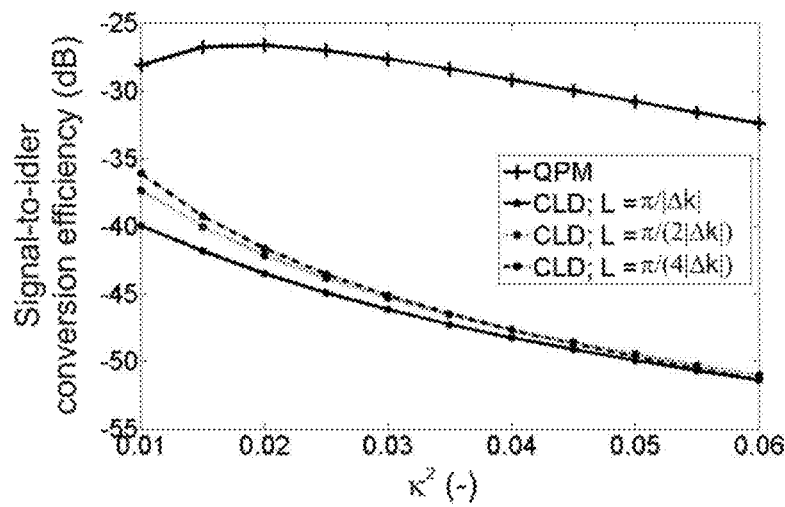
FIG. 7 illustrates the signal-to-idler conversion efficiency of the quasi-phase-matched ring parametric converter and of the coherence-length-dependent ring parametric converter with different ring circumferences as a function of $K_p^2=K_s^2=K_i^2$.
Figure 8:
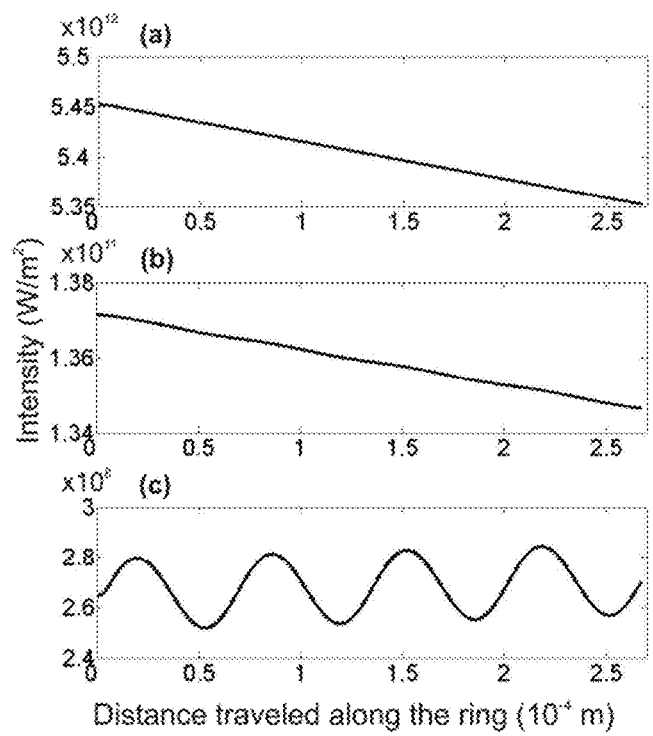
FIG. 8 illustrates (a) pump, (b) signal, (c) idler intensities in the ring of the quasi-phase-matched ring parametric converter with $K_j^2=0.02$, and with the intensity values at a distance of 0 μm (267 μm) corresponding to $|A_3|^2(|A_4|^2)$ in FIG. 1*a*.
Figure 9:
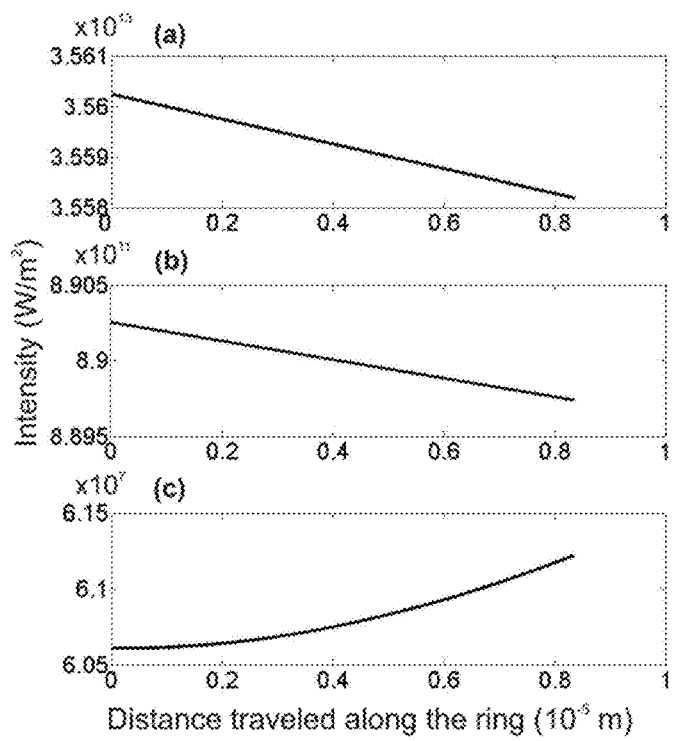
FIG. 9 illustrates (a) pump, (b) signal, (c) idler intensities in the ring of the coherence-length-dependent ring parametric converter with L=π/|4Δk|=8.4 μm, with $\kappa_j^2=0.01$, and with the intensity values at a distance of 0 μm (8.4 μm) corresponding to $|A_3|^2(|A_4|^2)$ in FIG. 1*a*.

Equations (6) to (9) are numerically solved for the two mid-infrared-pumped parametric converter setups using a signal input power of ($I_{s,in}$=2.5×10$^9$ W/m$^2$) and a fixed pump input power of 40 mW ($I_{p,in}$=1×10$^{11}$ W/m$^2$). The reason for taking a fixed pump input power is that in this comparison the pump-power-dependent nonlinear losses are negligible for both of the converters. The signal-to-idler conversion efficiencies of the QPM converter and of the CLD converter with different ring circumferences are shown in FIG. 7 as a function of the coupling coefficients κ$_j^2$ (j=p,s,i). For the working point of maximal conversion efficiency, the steady-state distributions along the ring of the pump, signal and idler intensities in the QPM (CLD) converter are shown in FIG. 8 (FIG. 9).

When comparing the graphs of FIG. 7, it can be seen that the maximally attainable conversion efficiency of the QPM converter, which equals −26.7 dB, is almost 10 dB, i.e. one order of magnitude, larger than the corresponding value of the CLD converter, equal to −36.1 dB which is obtained for an extremely small ring circumference L=π/|4Δk$_{lineair}$|=8.4 µm. In other words, the QPM parametroc converter is able to outperform the CLD parametric converter by as much as 10 dB.

In conclusion, the QPM parametric conversion method offers a feasible and competitive solution when efficient conversion needs to be achieved in the presence of a large-valued Δk$_{lineair}$, i.e. in the presence of a large-valued GVD at the pump wavelength and/or a large frequency difference between pump and signal. The predicted QPM parametric conversion efficiencies of the order of −33 dB, −29 dB, and −26.7 dB in the near- and mid-infrared spectral domains are high enough to generate microwatts of idler output power, which is a sufficiently high power level for the considered application domains such as spectroscopy. Finally, one has to keep in mind that this QPM parametric conversion method only offers efficient conversion for one specific set of pump, signal, and idler wavelengths, as the ring circumference has to be chosen in function of the phase mismatch between these wavelengths. So, the use of the QPM parametric conversion method presented here should be considered in the following context: in case one works with relatively small wavelength spacings yielding moderate |Δk$_{linear}$| values, one can rely on CLD parametric conversion, but at the specific set of (widely spaced) wavelengths for which the ring circumference allows quasi-phase-matching, one gets due to QPM parametric conversion a much larger conversion efficiency "for free." Therefore, if this specific set of wavelengths is often used in the application under consideration, the QPM parametric conversion method presented here can be of great value.

In yet another particular embodiment, reference is made to a QPM SFG system based on a spiral-shaped silicon waveguide covered by a graphene sheet through which an electrical current is flowing. In this embodiment the performance is calculated for a QPM SFG system based on a spiral-shaped silicon waveguide covered by a graphene sheet. To do this, first a modeling formalism for SFG converters is introduced. Without restricting the general validity of the results, focus is made on quasi-continuous-wave operation. The equations expressing the steady-state spatial variation of the slowly-varying pump, signal and idler field amplitudes $A_p(\zeta)$, $A_s(\zeta)$, $A_i(\zeta)$ (in the parametric SFG-based converter are given by:

$$\frac{dA_p}{d\zeta} = i\frac{2\omega_p}{n_p c}d_{eff}\rho(\theta)A_i A_s^* e^{-i\Delta k_{linear}\zeta} - \Gamma_p A_p \quad (10)$$

$$\frac{dA_s}{d\zeta} = i\frac{2\omega_s}{n_s c}d_{eff}\rho(\theta)A_i A_p^* e^{-i\Delta k_{linear}\zeta} - \Gamma_s A_s \quad (11)$$

$$\frac{dA_i}{d\zeta} = i\frac{2\omega_i}{n_i c}d_{eff}\rho(\theta)A_p A_s e^{i\Delta k_{linear}\zeta} - \Gamma_i A_i \quad (12)$$

where $\zeta$ represents the propagation distance along the spiral, $d_{eff}$ is the effective second-order nonlinearity, and $A_{\{p,s,i\}}$ normalized such that $2\epsilon_0 n_{\{p,s,i\}}c|A_{\{p,s,i\}}|^2$ corresponds to intensity. The function $\rho(\theta)$ defines the variation of the second-order susceptibility along the graphene-covered silicon spiral as experienced by the TE-polarized fields, and is, as specified earlier on, given by $\rho(\theta)=\cos\theta$ with $\theta$ defined as the angle between the local field polarization and the direction of the current flow. The terms in Eqs. (10)-(12) containing $e^{i\Delta k_{linear}\zeta}$ express the actual SFG interaction. The coefficients $\Gamma_{\{p,s,i\}}$ represent the optical losses in the graphene-covered silicon waveguide. These receive contributions from linear propagation losses, two-photon absorption (TPA) and TPA-induced free carrier absorption. In this embodiment one considers for the QPM SFG converter configuration a TE-polarized pump input and a TE-polarized signal input which both have the same wavelength, namely $\lambda_p=\lambda_s=2.34$ μm, and which both can be provided by the same laser providing an input intensity $I_{p,in}$. This leads to a generated idler wave with wavelength $\lambda_i=1.17$ μm. The system may have a structure as illustrated in FIG. 1j. When taking an SOI ridge waveguide with a central section of 220 nm height and 1170 nm width, and two side sections of 150 nm height and 180 nm width, and when tuning the chemical potential of the graphene sheet on top to 0.3 eV, the linear phase mismatch between the fundamental pump/signal TE-mode and the 7th-order idler TE-mode is given by $\Delta k_{linear}=k_p+k_s-k_i=-2\times 10^4$ m$^{-1}$ so that QPM can be obtained if the spiral has an average radius equal to $$R = \frac{1}{\Delta k_{linear}} = 50 \text{ μm}.$$

Figure 10A:
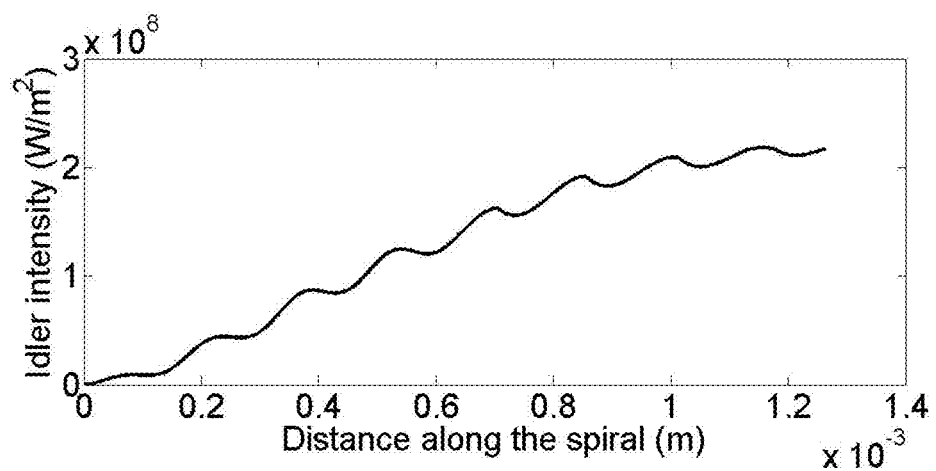
FIG. 10*a* illustrates the idler intensity in the spiral of a quasi-phase-matched SFG converter made of a uniform three-dimensional material covered by a uniform two-dimensional or quasi-two-dimensional material through which a current is flowing, as can be obtained in an embodiment according to the present invention.

When sending a current density of $10^3$ A/m through the graphene sheet, $d_{eff}\sim 100\times 10^{-12}$ m/V. For the remaining device parameters the following values were taken: waveguide modal area $A_{eff}=0.5$ μm, linear loss $\alpha=50$ dB/cm, effective two-photon absorption coefficient $\beta=25\times 10^{-11}$ m/W, effective free carrier absorption efficiency $\varphi=6\times 10^{-12}$, effective free carrier lifetime $\tau_{eff}=0.5$ ns, $I_{p,in}=2\times 10^{11}$ W/m$^2$. It is pointed out that the relatively small effective free carrier absorption efficiency is due to the fact that at the considered pump wavelength only the graphene sheet contributes to free carrier generation, and only a small fraction of these free carriers effectively diffuse to the silicon waveguide. One then can numerically solve equations (10) to (12) for the QPM SFG converter. FIG. 10a shows the distribution along the spiral for the idler intensity. The output idler intensity emerging from the spiral $I_{i,out}$ thus equals $2.2\times 10^8$ W/m$^2$ corresponding to a SFG efficiency (expressed in terms of power) given by $P_{i,out}/P_{p,in}=1.1\times 10^{-3}$ W W$^{-1}$ over a propagation distance of only 1.3 mm. The intensity distribution for the idler in FIG. 10a shows an oscillating build up typical for QPM and similarly to the QPM Raman converter and QPM Kerr converter presented in, respectively, embodiments 1 and 2. As is the case for the QPM Raman converter and QPM Kerr converter in, respectively, embodiments 1 and 2, the QPM concept yields also for the SFG converter considered here performance advantages compared to other phase-matching techniques. It should be noted that whereas the spiral has been designed such that it has an average radius $R=50$ μm, the actual bend radius along the spiral-shaped waveguide is not constant and varies over a range of values around 50 μm. This means that the QPM scheme used here can also work effectively for values of $\Delta k_{linear}$ not exactly equal to but around $1/R=-2\times 10^4$ m$^{-1}$, i.e. it can also work effectively for pump and idler wavelengths not exactly equal to but around 2.34 μm and 1.17 μm, respectively.

In still another particular embodiment, reference is made to a QPM SFG system based on a spiral-shaped silicon waveguide covered by a monolayer of MoS$_2$, which is a type of transition metal di-chalcogenides. In this embodiment the performance is calculated for a QPM SFG system based on a spiral-shaped silicon waveguide covered by a monolayer of MoS2. To do this, we employ the same modeling formalism for SFG converters as introduced in the previous embodiment.

Figure 1K:
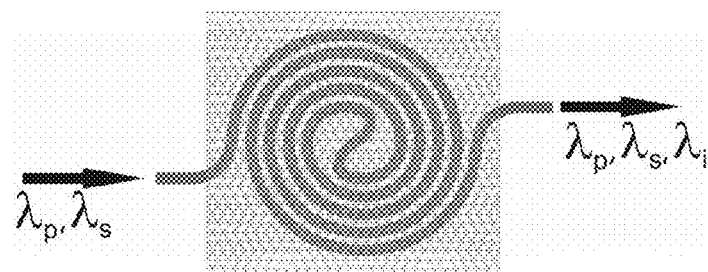
FIG. 1*k* illustrates a schematic top-view representation of a parametric converter or a parametric amplifier based on an open, double-spiral-shaped structure (not drawn to scale), the contours of which are along a circular ring and that is made of a uniform three-dimensional material and fully covered with a uniform two-dimensional or quasi-two-dimensional material layer with no current flowing through it, and wherein quasi-phase-matching according to an embodiment of the present invention can be obtained.

In this formalism, the function $\rho(\theta)$ defining the variation of the second-order susceptibility along the spiral covered with MoS$_2$ as experienced by the TE-polarized fields is given by $\rho(\theta)=\cos\theta(4\cos^2\theta-3)$ with $\theta$ defined as the angle between the local field polarization and an armchair direction of the monolayer MoS$_2$ crystal. As such, the QPM condition becomes $$R = s\frac{1}{\Delta k_{linear}}$$

with $s=\pm 3$. Since monolayer MoS$_2$ has, as opposed to graphene, no inversion symmetry, it is not needed here to send a current through the monolayer to induce a second-order nonlinearity $d_{eff}$. In this embodiment one considers for the QPM SFG converter configuration a TE-polarized pump input and a TE-polarized signal input which both have the same wavelength: $\lambda_p=\lambda_s=2.34$ μm. This leads to a generated idler wave with wavelength $\lambda_i=1.17$ μm. The system may have a structure as illustrated in FIG. 1k. When taking an SOI ridge waveguide with a central section of 220-nm height and 1170nm width, and two side sections of 150-nm height and 170 nm width, the linear phase mismatch between the fundamental pump/signal TE-mode and the 7th-order idler TE-mode is given by $\Delta k_{linear} = k_p + k_s - k_i = 1.36 \times 10^4$ m$^{-1}$ so that QPM can be obtained if the circle inscribed in the spiral equals $$R = \frac{3}{\Delta k_{linear}} = 220 \text{ μm}.$$

Figure 10B:
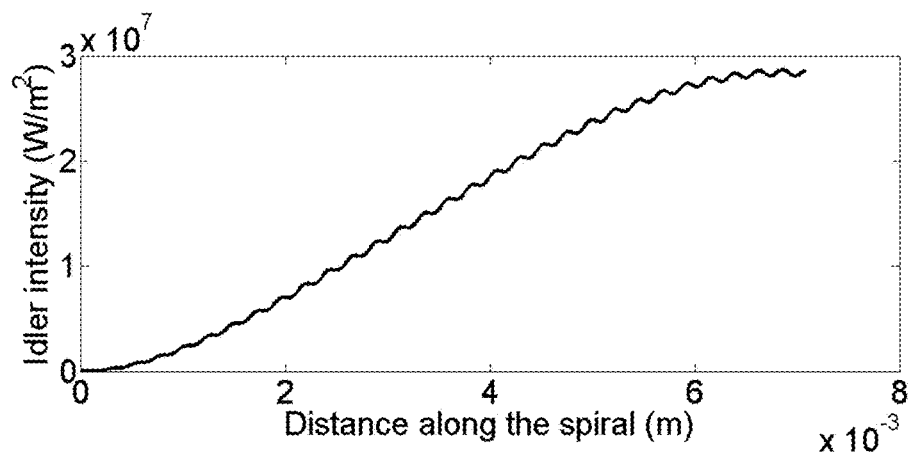
FIG. 10*b* illustrates the idler intensity in the spiral of a quasi-phase-matched SFG converter made of a uniform three-dimensional material covered by a uniform two-dimensional or quasi-two-dimensional material through which no current is flowing, as can be obtained in an embodiment according to the present invention.

For the considered configuration, $d_{eff} \sim 5 \times 10^{-12}$ m/V. For the remaining device parameters the same values were taken as in the previous embodiment, except the losses which we take $\alpha = 5$ dB/cm and $\beta = 0.5 \times 10^{-11}$ m/V. The reason for having lower losses here than for the graphene-based SFG converter of the previous embodiment is that MoS$_2$, as opposed to graphene, features a bandgap, and both the pump and idler photon energies that we consider here are below the bandgap energy of MoS$_2$. After numerically solving equations (10) to (12) for this QPM SFG converter, one obtains an idler intensity distribution as shown in FIG. 10b. The output idler intensity emerging from the spiral $I_{i,out}$ thus equals $2.8 \times 10^7$ $2.2 \times 10^8$ W/m$^2$ corresponding to a SFG efficiency (expressed in terms of power) given by $P_{i,out}/P_{p,i} = 1.4 \times 10^{-4}$ W W$^{-1}$ over a propagation distance of 7 mm. This performance is lower than the SFG efficiency converter in the previous embodiment because MoS$_2$ exhibits a lower second-order nonlinearity than the current-induced second-order nonlinearity of graphene, but at the same time MoS$_2$ offers the advantage that no current needs to be sent through the monolayer to induce the second-order nonlinearity. The intensity distribution for the idler in FIG. 10b shows an oscillating build up typical for QPM. Also for the SFG converter considered here, the QPM concept yields performance advantages compared to other phase-matching techniques.

In still another particular embodiment, reference is made to a QPM DFG system based on a spiral-shaped silicon waveguide covered by a graphene sheet through which an electrical current is flowing. In this embodiment the performance is calculated for a QPM DFG system based on a spiral-shaped silicon waveguide covered by a graphene sheet. To do this, first a modeling formalism for DFG converters is introduced. Without restricting the general validity of the results, focus is made on quasi-continuous-wave operation. The equations expressing the steady-state spatial variation of the slowly-varying pump, signal and idler field amplitudes $A_p(\zeta)$, $A_s(\zeta)$, $A_i(\zeta)$ in the parametric DFG-based converter are given by:

$$\frac{dA_p}{d\zeta} = i\frac{2\omega_p}{n_p c}d_{eff}\rho(\theta)A_i A_s e^{-i\Delta k_{linear}\zeta} - \Gamma_p A_p \quad (13)$$

$$\frac{dA_s}{d\zeta} = i\frac{2\omega_s}{n_s c}d_{eff}\rho(\theta)A_p A_i^* e^{i\Delta k_{linear}\zeta} - \Gamma_s A_s \quad (14)$$

$$\frac{dA_i}{d\zeta} = i\frac{2\omega_i}{n_i c}d_{eff}\rho(\theta)A_p A_s^* e^{i\Delta k_{linear}\zeta} - \Gamma_i A_i \quad (15)$$

where $\zeta$ represents the propagation distance along the spiral, $d_{eff}$ is the effective second-order nonlinearity, and $A_{\{p,s,i\}}$ is normalized such that $2\epsilon_0 n_{\{p,s,i\}} c|A_{\{p,s,i\}}|^2$ corresponds to intensity. The function $\rho(\theta)$ defines the variation of the second-order susceptibility along the graphene-covered silicon spiral as experienced by the TE-polarized fields, and is, as specified earlier on, given by $\rho(\theta) = \cos\theta$ with $\theta$ defined as the angle between the local field polarization and the direction of the current flow. The terms in Eqs. (13)-(15) containing $e^{i\Delta k_{linear}\zeta}$ express the actual DFG interaction. The coefficients $\Gamma_{\{p,s,i\}}$ represent the optical losses in the graphene-covered silicon waveguide. These receive contributions from linear propagation losses, two-photon absorption (TPA) and TPA-induced free carrier absorption. In this embodiment one considers for the QPM DFG converter configuration a TE-polarized pump input and a TE-polarized signal input which have the following wavelengths: $\lambda_p = 1.25$ μm, $\lambda_s = 2.1$ μm. This leads to a generated idler wave with wavelength $\lambda_i = 3.088$ μm. The system may have a structure as illustrated in FIG. 1j. When taking an SOI ridge waveguide with a central section of 220 nm height and 1170 nm width, and two side sections of 150 nm height and 180 nm width, and when tuning the chemical potential of the graphene sheet on top to 0.3 eV, the linear phase mismatch between the fundamental pump/signal TE-mode and the 6th-order idler TE-mode is given by $\Delta k_{linear} = k_p - k_s - k_i = 7 \times 10^4$ m$^{-1}$ so that QPM can be obtained if the spiral has an average radius equal to $$R = \frac{1}{\Delta k_{linear}} = 14 \text{ μm}.$$

Figure 11:
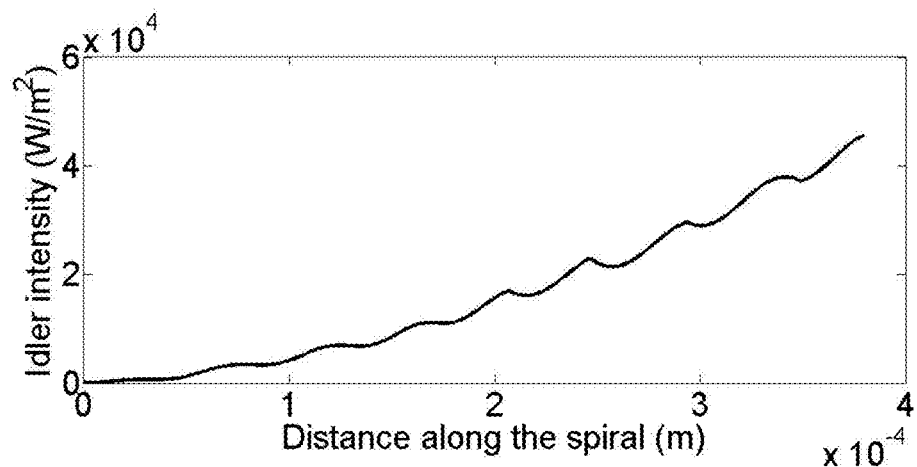
FIG. 11 illustrates the idler intensity in the spiral of a quasi-phase-matched DFG converter made of a uniform three-dimensional material covered by a uniform two-dimensional or quasi-two-dimensional material through which a current is flowing, as can be obtained in an embodiment according to the present invention.

When sending a current density of $10^3$ A/m through the graphene sheet, $d_{eff} \sim 100 \times 10^{-12}$ m/V. For the remaining device parameters the following values were taken: waveguide modal area $A_{eff} = 0.5$ μm$^2$, linear loss $\alpha = 50$ dB/cm, effective two-photon absorption coefficient $\beta = 25 \times 10^{-11}$ m/W, effective free carrier absorption efficiency $\varphi = 6 \times 10^{-12}$, effective free carrier lifetime $\tau_{eff} = 0.5$ ns, $I_{p,in} = 2 \times 10^{11}$ W/m$^2$, $I_{s,in} = 2 \times 10^8$ W/m$^2$. As in embodiment 3, the relatively small effective free carrier absorption efficiency is due to the fact that at the considered pump wavelength only the graphene sheet contributes to free carrier generation, and only a small fraction of these free carriers effectively diffuse to the silicon waveguide. One then can numerically solve equations (13) to (15) for the QPM DFG converter. FIG. 11 shows the distribution along the spiral for the idler intensity. The output idler intensity emerging from the spiral $I_{i,out}$ equals $4.6 \times 10^4$ W/m$^2$ corresponding to a DFG efficiency $I_{i,out}/I_{s,in}$ of 36 dB over a propagation distance of only 380 μm. The intensity distribution for the idler in FIG. 11 shows an oscillating build up typical for QPM and similarly to the QPM Raman converter and QPM Kerr converter presented in, respectively, embodiments 1 and 2. As is the case for the QPM Raman converter and QPM Kerr converter in, respectively, embodiments 1 and 2, the QPM concept yields also for the DFG converter considered here performance advantages compared to other phase-matching techniques. It should be noted that whereas the spiral has been designed such that the spiral has an average radius R=14 μm, the actual bend radius along the spiral-shaped waveguide is not constant and varies over a range of values around 14 μm. This means that the QPM scheme used here can also work effectively for values of $\Delta k_{linear}$ not exactly equal to but around $$\frac{1}{R} = 7 \times 10^4 \text{ m}^{-1},$$

i.e. it can also work effectively for pump, signal and idler wavelengths not exactly equal to but around 1.25 μm, 2.1 Ξm, and 3.088 μm, respectively.

Figure 13:
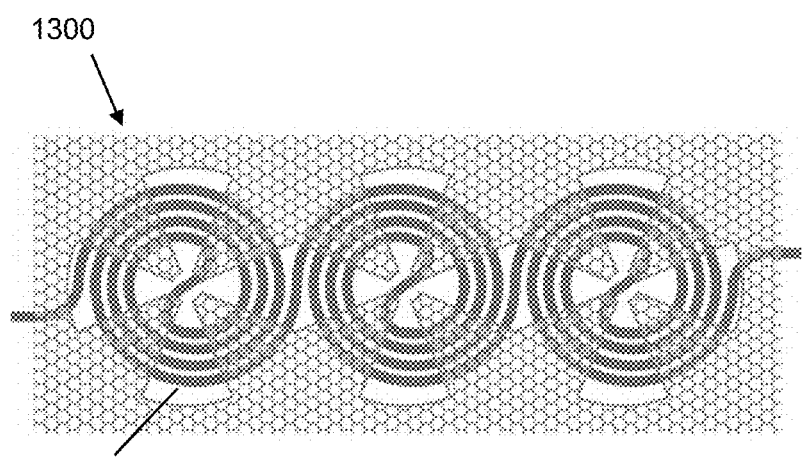
FIG. 13 illustrates a schematic top-view representation of a parametric converter or a parametric amplifier based on open, double-spiral-shaped structures, the contours of which are along a circular ring and that is made of a uniform three-dimensional material and partially covered with a patterned, two-dimensional or quasi-two-dimensional material layer, and wherein quasi-phase-matching according to an embodiment of the present invention can be obtained.

In still another particular embodiment, reference is made to a bent structure being adjacent spiral-shaped waveguides made of a uniform three-dimensional material covered with graphene that is locally removed along a pie-shaped pattern with micron-scale resolution. The structure 1300 is shown in FIG. 13 whereby the graphene sheet is shown as the honeycomb-structured top layer 1305.

The two-dimensional or quasi-two-dimensional material used in the present embodiment is again graphene. In the present embodiment, only part of the waveguides have a local periodic graphene coverage as a way for establishing quasi-phase-matching. Such a local, periodic coverage is realized by patterning the graphene e.g. with laser ablation without damaging the underlying waveguide. In the present example, a pie-shape-patterned graphene layer is created, whereby the light waves traveling along the bent structure, in the present example a spiral shaped waveguide design, will periodically experience the presence of the graphene top layer.

Similar as in other embodiments, the device results in the possibility for nonlinear optical wave mixing with quasi-phase-matching.

Figure 14:
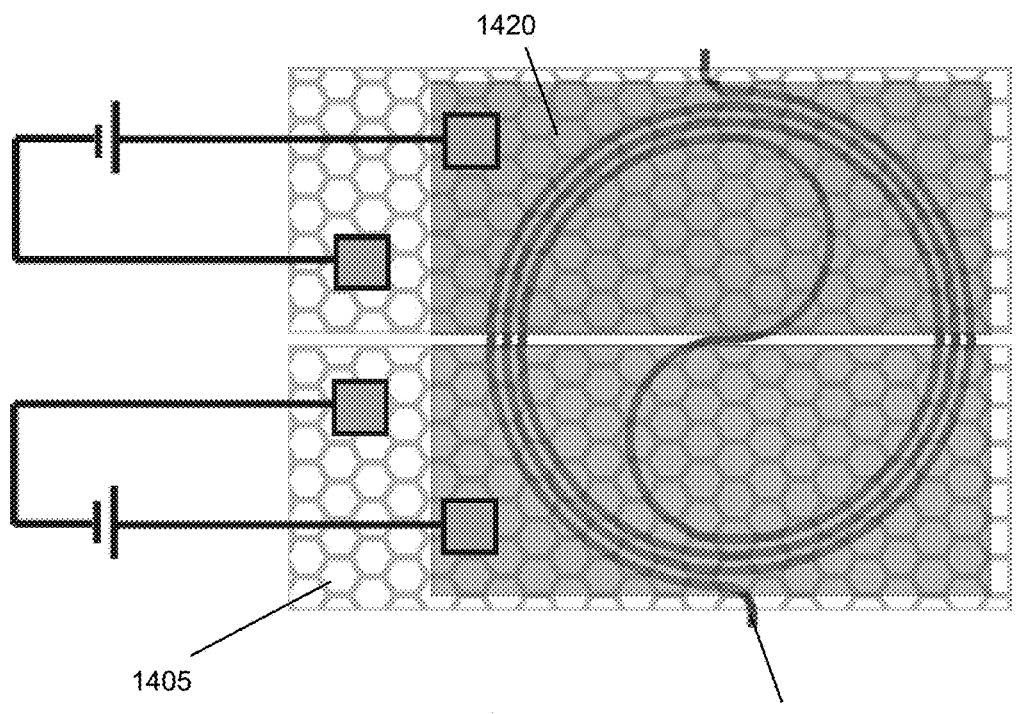
FIG. 14 illustrates a schematic top-view representation of a parametric converter or a parametric amplifier based on open, double-spiral-shaped structures, the contours of which are along a circular ring and that is made of a uniform three-dimensional material and covered with a two-dimensional or quasi-two-dimensional material layer with local chemical modification, and wherein quasi-phase-matching according to an embodiment of the present invention can be obtained.

In yet another particular embodiment, a device is described comprising a bent structure with on top a graphene layer that is electrically or chemically modified. Such a structure is shown in FIG. 14, illustrating the underlying bent structure 1410 and a covering layer 1405, whereby different parts of the covering layer 1420 are modified differently by being subjected to a different voltage.

In this further particular embodiment, the wideband wavelength conversion in a foundry-compatible 220 nm-thick SOI waveguide combined with graphene is further explored. The graphene deposition enables for the first time QPM for Kerr FWM along the 'ideal' scheme of nonlinearity sign reversal. Making use of the tunability of the graphene properties through control of its chemical potential μ, it is indeed possible to periodically reverse the sign of the effective FWM nonlinearity experienced by the TE waveguide modes along their propagation path, enabling for the first time QPM of FWM processes employing the 'ideal' and most effective scenario. In this embodiment, as an example the wavelength conversion performance of a spiral-shaped graphene-covered foundry-compatible SOI waveguide in the QPM regime was simulated, and compared with the performance attainable in the bare SOI waveguide. The structure is shown in FIG. 14.

By way of illustration, the theoretical principles applicable for the exemplary embodiment are given below. The spatial evolution of the pump, signal and idler fields at frequencies $\nu_{(p,s,i)}$ or wavelengths $\lambda_{(p,s,i)}$ in a graphene covered SOI waveguide converter is governed by nonlinear propagation equations that describe Kerr-nonlinear interactions, including not only the FWM conversion process but also Kerr-induced phase modulation. Raman nonlinear interactions are excluded since one can assume that the FWM transitions are detuned far away from the Raman resonances of graphene. Furthermore, focus is put on (quasi-) continuouswave operation in the strong-pump approximation, and it is assumed that all fields are TE polarized. Finally, although a graphene-covered SOI waveguide is a heterogeneous medium, the fields will be described in the same way as those in a homogeneous waveguide and effective waveguide parameters are introduced to take into account the medium's hybrid structure. As such, one can use the following set of generic equations for describing the steady-state spatial evolution of the slowly varying pump, signal, and idler field amplitudes $A_p(\zeta)$, $A_s(\zeta)$, $A_i(\zeta)$:

$$\frac{\partial A_p}{\partial \zeta} = i\bar{\gamma}_S |A_p|^2 A_p - \bar{\alpha}_p A_p - \left(\frac{\omega_r}{\omega_p}\right)^2 \left(\frac{\sigma_{FCA}}{2} - i\frac{\omega_p}{c}\sigma_{FCI}\right)\bar{N} A_p \quad (16)$$

$$\frac{\partial A_s}{\partial \zeta} = i\bar{\gamma}_{C1}|A_p|^2 A_s + i\bar{\gamma}_{M1} A_p^2 A_i^* e^{-i\Delta k \zeta} - $$
$$\bar{\alpha}_s A_s - \left(\frac{\omega_r}{\omega_s}\right)^2 \left(\frac{\sigma_{FCA}}{2} - i\frac{\omega_s}{c}\sigma_{FCI}\right)\bar{N} A_s \quad (17)$$

$$\frac{\partial A_i}{\partial \zeta} = i\bar{\gamma}_{C2}|A_p|^2 A_i + i\bar{\gamma}_{M2} A_p^2 A_s^* e^{-i\Delta k \zeta} - $$
$$\bar{\alpha}_i A_i - \left(\frac{\omega_r}{\omega_i}\right)^2 \left(\frac{\sigma_{FCA}}{2} - i\frac{\omega_i}{c}\sigma_{FCI}\right)\bar{N} A_i \quad (18)$$

where $\zeta$ is the spatial coordinate along the waveguide, and where $A_{p,s,i}(\zeta)$ are normalized such that $|A_{p,s,i}|^2$ corresponds to power. The FWM terms are those that contain both the linear phase mismatch_

$$\Delta k = -2k_p + k_s + k_i$$

(with $k_{p,s,i}$ being the pump, signal and idler wave numbers), and the effective coefficients $$\bar{\gamma}_{M1;M2} = \gamma_{M1,Si;M2,Si} + \gamma_{M1,g;M2,g},$$

comprising contributions from the SOI waveguide and the graphene sheet. In Eq. (16) the effective coefficient contains $\gamma_{S,Si}$ accounting for self-phase modulation and two-photon absorption at the pump wavelength in the SOI waveguide, and also comprises $\gamma_{S,g}$ capturing the corresponding phenomena in the graphene layer. In Eqs. (17)-(18) the effective coefficients $\bar{\gamma}_{C1;C2}$ consist of $\gamma_{C1,Si;C2,Si}$ covering cross-phase modulation and cross two-photon absorption in the SOI waveguide for pump/signal and pump/idler photons, respectively, and also comprises $\gamma_{C1,g;C2,g}$ representing the equivalent effects in the graphene. The factors $\bar{\alpha}_{p;s;i} = \alpha_{p,Si;s,Si;i,Si} + \alpha_{p,g;s,g;i,g}$ account for the linear losses in the SOI waveguide and the graphene sheet. All the effective parameters are function of the spatial coordinate $\zeta$, as is required for QPM operation. The last term in Eqs. (16)-(18) represents free-carrier effects with $\sigma_{FCA}$ and $\sigma_{FCI}$ coefficients quantifying the efficiency of free-carrier absorption and free-carrier index change, respectively, and with $\omega_{(p,s,i)} = 2\pi\nu_{(p,s,i)}$ and $\omega_r 2\pi c/(1550$ nm$)$ where c indicates the speed of light. The factor $\bar{N}$ in this term is the effective free-carrier density in the waveguide:

$$\bar{N} = \frac{\tau_{eff}}{2h\nu_p A'}(\text{Im}(2\gamma_{S,Si}) + r_D \text{Im}(2\gamma_{S,g}))|A_p|^4 + \quad (19)$$
$$\frac{\tau_{eff} r_D}{h\nu_p A'} \times \left(2\alpha_{p,g}|A_p|^2 + 2\alpha_{s,g}|A_s|^2 \frac{\nu_p}{\nu_s} + 2\alpha_{i,g}|A_i|^2 \frac{\nu_p}{\nu_i}\right)$$

with h Planck's constant. The first term at the right-hand side of Eq. (19) represents the free-carrier generation induced by two-photon absorption in the SOI waveguide and the corresponding absorption contribution in the graphene top layer, and the second term indicates the free-carrier generation induced by one-photon absorption in the graphene layer only. The graphene contribution to these two terms has been expressed in a rather phenomenological way since not all photons absorbed in the graphene sheet give rise to the creation of free carriers and instead can contribute to, amongst others, intra-band transitions. The factor $\tau_{eff}$ in Eq. (19) indicates the effective free-carrier lifetime. Because of the short free-carrier lifetime in graphene, only the graphene-generated free carriers that diffuse into the silicon waveguide will effectively contribute to the free-carrier effects. As such, in the numerical simulations it is allowed to employ the values for $\tau_{eff}$, $\sigma_{FCA}$ and $\sigma_{FCI}$ of the bare SOI waveguide, and incorporate the contribution from the graphene-generated free carriers by including a graphene-to-SOI diffusion ratio $r_D$ in Eq. (19). This ratio quantifies the fraction of the free carriers generated in the graphene that diffuses into the SOI waveguide. Finally, the factor A' in Eq. (19) represents the waveguide crosssectional area over which the free carriers are distributed. Turning now to the FWM terms in Eqs. (16)-(18), both the linear phase mismatch $$k = -2k_p + k_s + k_i$$

and the nonlinear phase mismatch contribution, function of $Re(\overline{\gamma}_S)$ and the pump power $P_p$, need to be added up to obtain the full phase mismatch $\Delta k_{total}$. Using a Taylor series expansion for the linear contribution, $\Delta k_{total}$ can be expressed as $$\Delta k_{total} = \beta_2 \Delta \omega_{pk}^2 + (1/12)\beta_1 \Delta \omega_{ps}^4 + 2Re(\overline{\gamma}_S)P_p \quad (20)$$

with $\beta_i$ representing the i-th order dispersion at the pump wavelength and with $\omega_{ps} = 2\pi|v_s - v_p|$.

For signal and idler wavelengths far away from the pump wavelength, the total phase mismatch can become very large in absolute value, hence inducing a change in the fields' phase relation so that the term $\cos(-\Delta k_{total} \zeta)$ determining the idler power evolution will periodically evolve along the waveguide from $\cos(0)=1$ to $\cos(\pi)=-1$ and back. As a result, there will be a reversal of the conversion process with idler photons being annihilated, deteriorating the net idler growth. The latter can be overcome by employing QPM, so that for a discrete set of signal and idler frequencies very far away from the pump frequency one can also attain an efficient idler growth. Generally speaking, QPM aims at periodically compensating the phase-mismatch-induced change in the fields' phase relation while avoiding the detrimental reversal of the conversion process, so that an overall efficient growth of the idler power is achieved. Ideally, in the sections where the sign of $\cos(-\Delta k_{total} \zeta)$ has changed, one should also have a sign reversal in the Kerr nonlinearity, so that both sign changes annihilate each other and the idler continues to grow.

As mentioned, the different effective coefficients in Eqs. (16)-(18) take into account the contributions from both the SOI waveguide and the graphene top layer. The impact of the latter on both the loss parameters and the nonlinear parameters can be very strong. Experimental investigations with isolated graphene at photon energies above the one-photon absorption onset (i.e. $h\nu > 2|\mu|$) have revealed extremely high values for the nonlinearity of the two-dimensional material. Our recent calculations indicate that, when the chemical potential $\mu$ is tuned such that the photon energy is just below the onset of one-photon absorption, the nonlinearities also become very strong due to the presence of a resonance peak. This is not surprising, since conventional semiconductors also exhibit strong nonlinearity just below the threshold for single photon absorption. In addition, when moving from the one-photon to the two-photon absorption threshold a sign change occurs in the graphene nonlinearities, which is also in line with the behavior of the nonlinearities of direct-bandgap semiconductors. For fixed photon energies this sign change can be controlled by changing $\mu$. Hence, by spatially varying the chemical potential $\mu$ of a graphene layer on top of an SOI waveguide using e.g. locally deposited electrolyte gates, it should be possible to establish QPM conversion along the 'ideal' scheme where the nonlinearity periodically reverses sign along the propagation path.

Figure 15:
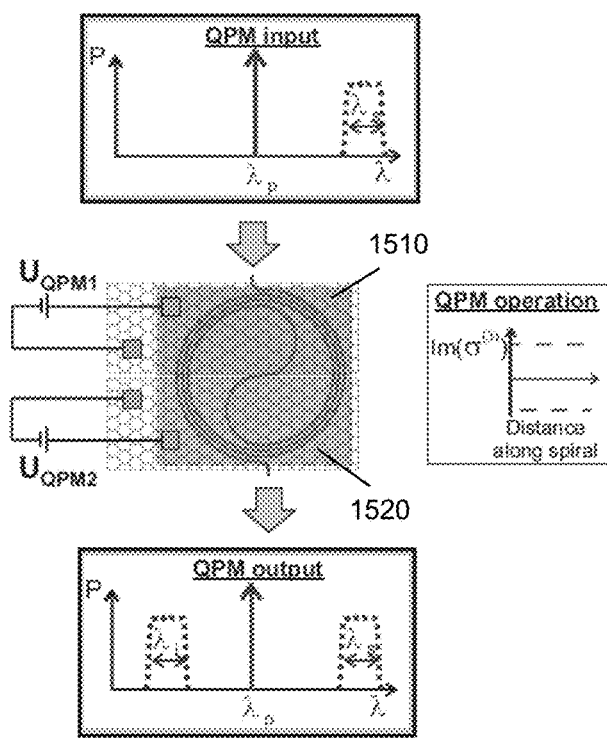
FIG. 15 illustrates the basic concept of a graphene covered spiral-shaped silicon-on-insulator (SOI) waveguide converter with quasi-phase-matched operation according to an embodiment of the present invention. The upper and lower spiral halves are covered with two separate graphene sheets. These graphene sheets are covered in turn with separate solid polymer electrolyte gates, indicated as dark-shaded and light-shaded areas. On top of each gate and on its underlying graphene sheet electrical contacts are placed, across which a voltage is applied to tune the graphene properties. Different voltages are applied to the two gates so that the propagating fields experience a spatially varying graphene nonlinearity along the spiral path (see right-hand side of FIG. 15).

To numerically investigate the attainable conversion efficiency in QPM regime, we considered as a case study a foundry-compatible 220 nm-thick SOI waveguide converter shaped as a double spiral and covered with graphene. As shown in FIG. 15, the upper and lower spiral halves are covered with two separate graphene sheets with a small interspacing. These sheets are covered in turn with solid polymer electrolyte gates, indicated as the dark-shaded area ('gate 1') 1510 and the light-shaded area ('gate 2') 1520. These two electrolyte gates are also separated by a small spacing. On top of each gate and on its underlying graphene sheet electrical contacts are placed, across which a voltage is applied to tune the graphene properties. By applying different bias voltages to the two gates, the optical fields propagating in the spiral waveguide experience the graphene nonlinearity with periodically changing sign along the spiral as required for QPM operation. QPM operation will not be affected by the spacing between the two graphene sheets as long as it is kept below a few micron, which is very well feasible using e.g. photolithographic graphene patterning. The particular converter design sketched in FIG. 14 offers several practical advantages: While the use of a spiral waveguide enables a small device footprint, the large-area gate patterning on top is less prone to fabrication errors than when depositing individual gates on each spiral section separately. As well, the solid polymer electrolyte gates made of e.g. LiClO4 and Poly(ethylene) Oxide (PEO) allow tuning the chemical potential of graphene to very high values using only low voltages (e.g. $|\mu| > 0.8$ eV using a voltage of only 3V), and can nowadays be patterned with submicron accuracy.

Another important asset of the spiral design is that in the QPM regime the periodicity of the positive nonlinear and negative nonlinear waveguide sections is chirped. As such, this converter design allows QPM operation not just for one discrete signal wavelength far away from the pump wavelength, but for a continuous band of signal wavelengths, hence enabling truly wideband conversion.

In what follows, the design parameters of the targeted graphene-covered SOI waveguide converter were determined. To find the optimal values for the graphene chemical potential $|\mu|$, graphs were used generated based on a theory for both the linear and nonlinear conductivities of graphene. This way it was determined at which $|\mu|$—values both low linear absorption and strong nonlinear effects were seen. Our theoretical curves for the linear conductivity are in line with experimental data and with the widely used Kubo-formalism, so that we can directly implement these theoretical data in our numerical simulations for the converter. In contrast, the theoretical curves for the nonlinear conductivity are systematically lower than what has been experimentally observed, so we take them only as a qualitative guide. We use them only to estimate at which values of $|\mu|$ with low linear absorption we can expect nonlinearities as strong as those observed experimentally at $|\mu|$—values where the linear absorption was high. We then take these values of $|\mu|$ with small linear absorption as our working point, and implement the experimentally determined values of the nonlinearity in our numerical simulations.

Figure 16:
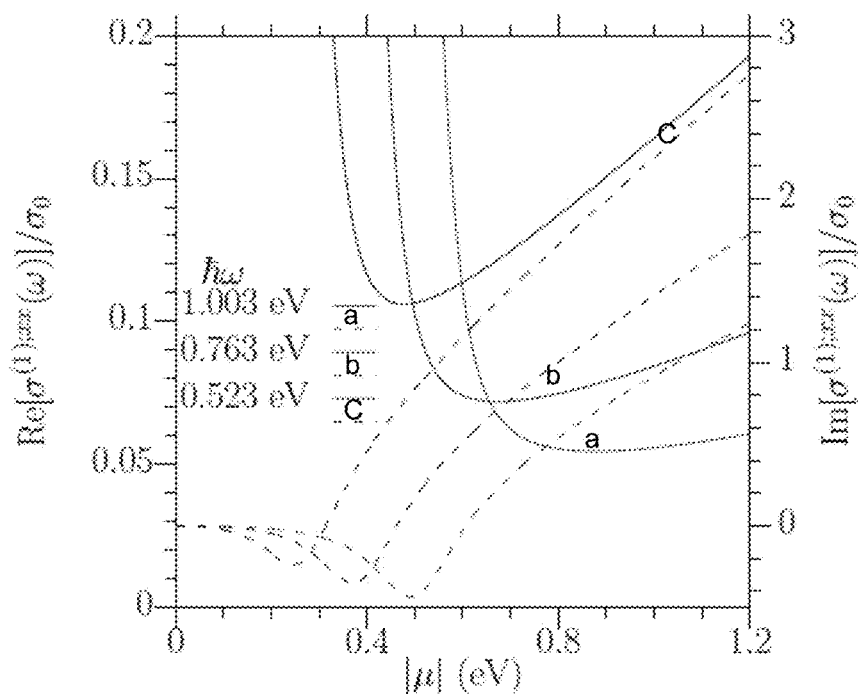
FIG. 16 illustrates graphene's linear conductivity at room temperature for the photonenergies of 0.523 eV, 0.763 eV and 1.003 eV versus chemical potential. The inter- and intra-band scattering rates are taken to be 33 meV, as can be used in embodiments of the present invention. The values for the real and imaginary parts are shown on the left and right axes, respectively, and for the real part only that part of the curve is shown that is below 0.260.
Figure 17:
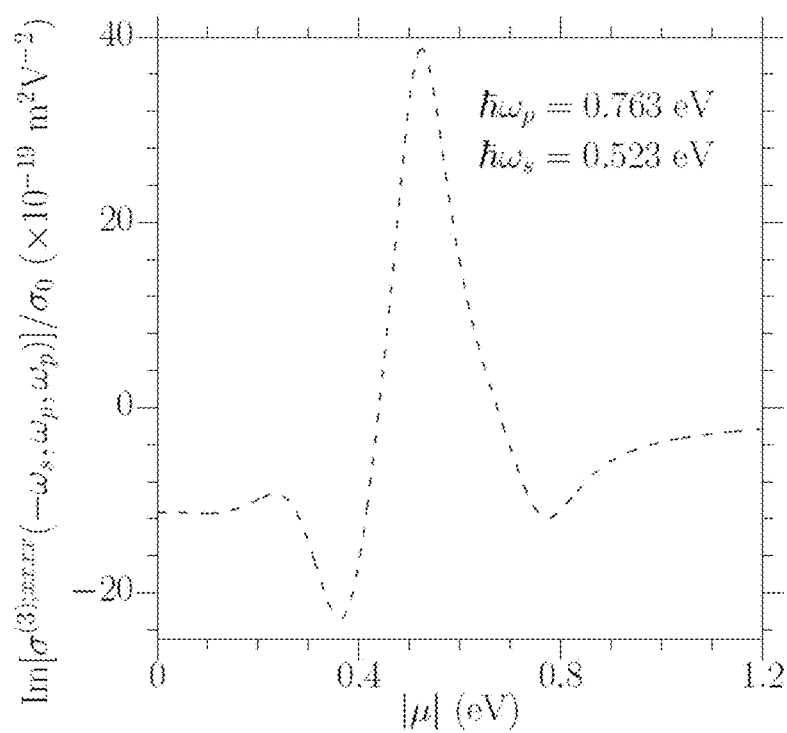
FIG. 17 illustrates graphene's nonlinear conductivity for four-wave mixing with a pump photon energy of 0.763 eV and a signal photon energy of 0.523 eV versus chemical potential, as calculated. In the calculations, room temperature is assumed, and the inter- and intra-band scattering rates are taken to be 33 meV, as can be used in embodiments of the present invention. Only the qualitative trends of this curve should be considered; the quantitative nonlinearity values used in the numerical simulations for the converter differ from the values indicated in this graph.

As a case study, we consider QPM conversion between $\lambda_s = 2370$ nm (i.e. a signal photon energy of 0.523 eV) and $\lambda_i = 1236.4$ nm (i.e. an idler photon energy of 1.003 eV), while pumping at $\lambda_p = 1625$ nm. For the converter of FIG. 15 to operate in the QPM regime, gates 1 and 2 should induce different chemical potentials in the underlying graphene sections so that these acquire FWM nonlinearities of opposite sign. Also, the chemical potentials should be chosen such that the linear absorption loss Re($\sigma^{(1)}$) remains low. As shown in FIG. 16, the chemical potentials where this requirement is met at all three involved photon energies ranges from approximately 0.6 eV to 1 eV. To establish efficient QPM conversion, we thus need to determine two chemical potentials within this range that yield strong FWM nonlinearities with opposite sign. Graphene's third-order conductivity Im($\sigma^{(3)}(-\omega_s, \omega_p, \omega_p)$) for FWM at the considered photon energies will vary with the chemical potential as shown in FIG. 17. The qualitative trends of this curve indicate 0.6 eV and 0.77 eV as two interesting chemical potential values for QPM conversion. To our knowledge no experimental data are available for wideband FWM in graphene at such high chemical potentials, but experimental wideband FWM experiments have been carried out in graphene with $|\mu|\approx 0$ eV. Taking into account that the trends in FIG. 17 indicate that the nonlinearities at $|\mu|=0.6$ eV and 0.77 eV are at least equally as large in absolute values as that reported in the wideband FWM experiments at a small chemical potential (the reported nonlinearity is Im($\sigma^{(3)}(-\omega_s, \omega_p, \omega p)$) =1.80 $\sigma 0 \times 10^{-16}$ m$^2$/V$^2$), we adopt Im($\sigma^{(3)}(-\omega_s, \omega_p, \omega_p)$)=1.80 $\sigma_0 \times 10^{-16}$ m$^2$/V$^2$ and $-1.80\sigma_0 \times 10^{-16}$ m$^2$/V$^2$ at $|\mu|=0.6$ eV and 0.77 eV, respectively. Tuning the bias voltages of gates 1 and 2 such that the underlying graphene sections acquire $\mu_{QPM1}=0.77$ eV and $\mu_{QPM2}=0.6$ eV, respectively, thus is an appropriate working point for the targeted QPM conversion. A detailed overview of the corresponding graphene conductivities and of graphene's contributions to the effective parameters of the converter with QPM operation can be found in Table I.

TABLE I

|  | QPM - gate 1 | QPM - gate 2 |
|---|---|---|
| $\sigma^{(1)}(\omega_p)/\sigma_0$ (-) | 0.074 | 0.074 |
| $\sigma^{(1)}(\omega_s)/\sigma_0$ (-) | 0.133 | 0.114 |
| $\sigma^{(1)}(\omega_i)/\sigma_0$ (-) | 0.056 | 0.111 |
| $\sigma^{(3)}(-\omega_p, \omega_p, \omega_p)/\sigma_0$ ($\times 10^{-16}$ m$^2$/V$^2$) | 1.84 − i 1.80 | 1.84 − i 1.80 |
| $\sigma^{(3)}(-\omega_s, \omega_p, \omega_p)/\sigma_0$ ($\times 10^{-16}$ m$^2$/V$^2$) | −i 1.80 | i 1.80 |
| $\alpha_{p,g}$ ($\times 10^3$ m$^{-1}$) | 0.61 | 0.61 |
| $\alpha_{s,g}$ ($\times 10^3$ m$^{-1}$) | 1.19 | 1.02 |
| $\alpha_{i,g}$ ($\times 10^3$ m$^{-1}$) | 0.35 | 0.70 |
| $\gamma_{s,g}$ ($\times 10^2$ m$^{-1}$W$^{-1}$) | 8.80 + i 9.00 | 8.80 + i 9.00 |
| $\gamma_{C1,g}$ ($\times 10^2$ m$^{-1}$W$^{-1}$) | 15.05 + i 15.38 | 15.05 + i 15.38 |
| $\gamma_{C2,g}$ ($\times 10^2$ m$^{-1}$W$^{-1}$) | 14.90 + i 15.22 | 14.90 + i 15.22 |
| $\gamma_{M1,g}$ ($\times 10^2$ m$^{-1}$W$^{-1}$) | 3.89 | −3.89 |
| $\gamma_{M2,g}$ ($\times 10^2$ m$^{-1}$W$^{-1}$) | 7.46 | −7.46 |

We now turn to the properties of the SOI spiral waveguide. In the QPM regime the sections where the sign of cos($\Delta$ktotal $\zeta$) has changed should correspond to the sections where the FWM nonlinearity has a reversed sign as well. For a converter configuration as in FIG. 14 the sign reversal of the nonlinearity occurs every time the spiral angle varies over $\pi$. Following the same reasoning as in literature and taking into account that the nonlinear phase mismatch is small as compared to the linear part, the condition for having FWM in the QPM regime is given by $$R_{avg} = \frac{1}{|\Delta k|} \quad (21)$$

with $R_{avg}$ representing the average radius of the spiral-shaped waveguide. For the pump, signal and idler wavelengths under consideration and for an SOI waveguide width of 670 nm and height of 220 nm, the linear phase mismatch $\Delta k$ in the graphene covered waveguide equals $4.4 \times 10^4$ m$^{-1}$, for which Eq. (21) yields $R_{avg}=23$ μm.

Figure 18:
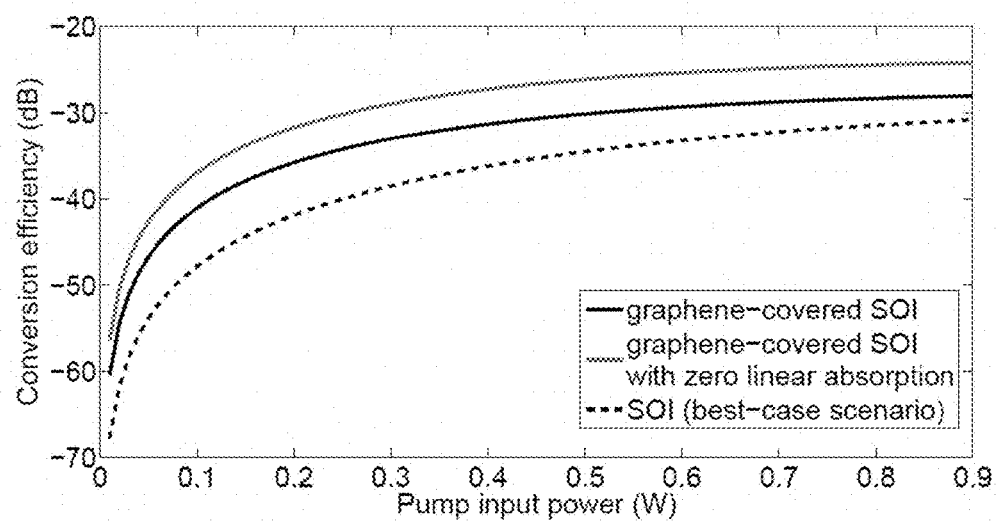
FIG. 18 illustrates the signal-to-idler conversion efficiency in the quasi-phase-matched regime versus pump input power for: the graphene-covered converter (solid black line); the graphene-covered converter in the absence of linear absorption (solid grey line); the bare SOI waveguide converter along the best-case scenario (dashed black line). For all simulations the signal input power $P_{s,in}$ is taken to be 250 µW, as can be used in embodiments of the present invention.
Figure 19:
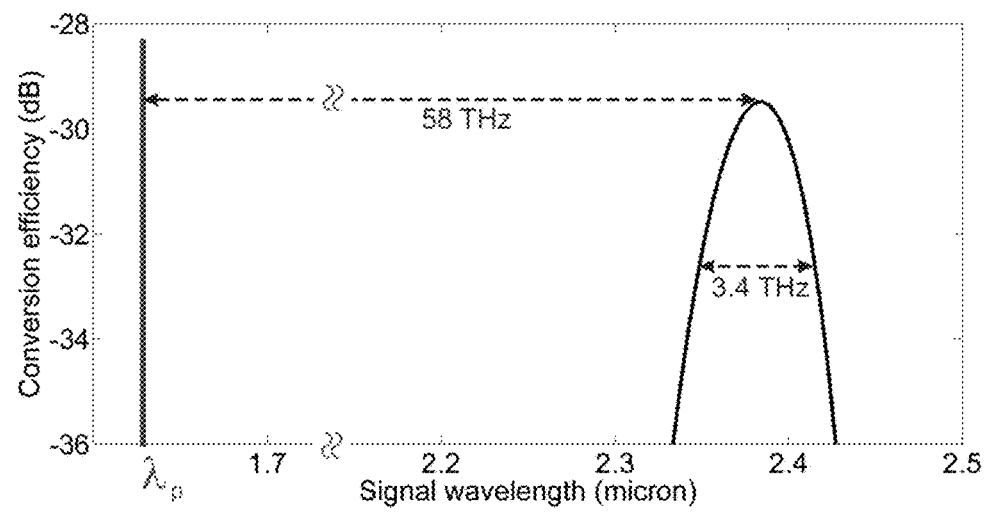
FIG. 19 illustrates the signal-to-idler conversion efficiency of the graphene-covered SOI waveguide converter in the quasi-phase-matched regime for a pump input power of 500 mW and a signal input power of 250 µW as a function of signal wavelength centered around 2370 nm. The latter corresponds to a pump-signal frequency spacing of 58 THz. The −3 dB quasi-phase-matching bandwidth is found to be 3.4 THz, as can be used in embodiments according to the present invention.
Figure 20:
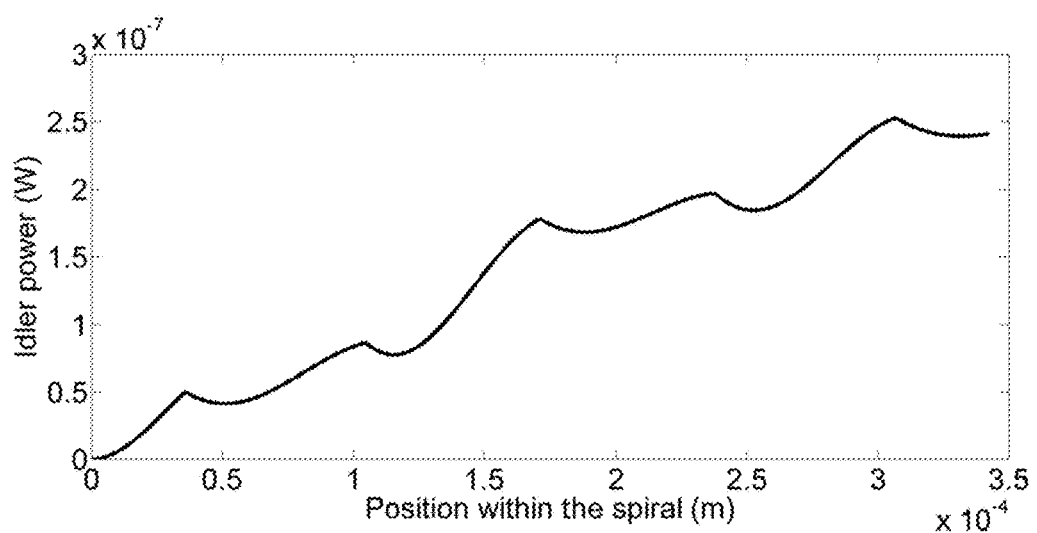
FIG. 20 illustrates the spatial evolution of the idler power within the spiral converter in the quasi-phase-matched regime for a pump input power of 500 mW and a signal input power of 250 µW, as can be used in embodiments of the present invention.

Using the graphene parameter values specified above, we obtain for the effective parameters the values in Table 1. To calculate the attainable conversion efficiencies in the QPM regime for the considered graphene-covered SOI waveguide converter and for its bare counterpart, we solve Eqs. (16)-(19) for signal and idler wavelengths of 2370 nm and 1236.4 nm, and for pump input powers $P_{p,in}$ ranging between 10 mW and 900 mW, and we plot the corresponding conversion efficiencies in FIG. 18. To quantify the QPM bandwidth of the graphene-covered converter, we also solve Eqs. (16)-(19) for varying $\lambda_s$ and $\lambda_i$ in the vicinity of 2370 nm and 1236.4 nm, respectively. The resulting conversion efficiencies are shown in FIG. 19. To illustrate what happens inside the spiral, FIG. 20 shows how the idler power evolves within the graphene covered spiral for a pump input power $P_{p,in}$ of 500 mW. For all simulation results the signal input power $P_{s,in}$ is again taken to be 250 μW. In FIG. 17 we also plot the best-case scenario efficiency curve for the bare SOI waveguide without graphene on top. Based on literature study and taking into account the wide spacing of the pump signal and idler wavelengths, we found that this best-case scenario efficiency corresponds to a 12 dB enhancement as compared to the efficiency one obtains in the bare SOI waveguide in case of an infinitely large phase mismatch for the Kerr FWM process.

Although we have deliberately plotted the best-case scenario conversion efficiency for the bare SOI converter in FIG. 17, we find that the graphene-covered SOI waveguide with the new QPM scheme introduced here yields significantly higher conversion efficiencies. At low pump powers, performance improvements up to 8 dB can be achieved. The attainable conversion efficiencies of the graphene-covered converter in the QPM regime can exceed −30 dB for sub-watt level pump powers and a propagation distance of only 350 μm. FIG. 19 illustrates the oscillating nature of the idler power growth as expected for QPM operation. We remark that, when totally neglecting the linear graphene absorption in the graphene-covered converter, QPM performances close to −20 dB are predicted as shown by the solid grey curve in FIG. 18.

FIG. 19 illustrates that thanks to the chirped nature of the QPM periodicity in the spiral-shaped graphene-covered SOI waveguide, efficient QPM operation is not just obtained at one discrete signal wavelength, but over a continuous band around the design signal wavelength $\lambda s=2370$ nm. Its −3 dB-bandwidth equals 3.4 THz. The use of graphene as a waveguide cover layer thus opens up different routes towards wideband FWM conversion in foundry-compatible SOI structure, as is illustrated from the example given above.

Whereas the above aspect has been mainly described with reference to system features, as indicated it also relates to a method for obtaining conversion or amplification, using QPM nonlinear optical wave mixing. Such a method comprises receiving a pump radiation beam and a signal radiation beam in a bent structure, a waveguiding portion of the bent structure being made of a uniform three-dimensional material at least partly covered by a two-dimensional or quasi-two-dimensional material layer, and the dimensions of the bent structure being selected for obtaining QPM nonlinear optical wave mixing. The method also comprises obtaining an idler radiation beam by interaction of the pump radiation beam and the signal radiation beam using at least one QPM nonlinear optical process such as for example a QPM SFG, a QPM DFG, a QPM Raman-resonant FWM or QPM Kerr-induced FWM process. The method furthermore encloses coupling out an idler radiation beam from the bent structure. Other or more detailed method steps may be present, expressing the functionality of components of the system as described above.

In one aspect, the present invention also relates to a method for designing a converter or amplifier using QPM nonlinear optical wave mixing. The converter or amplifier thereby may be using a pump radiation beam and a signal radiation beam. The method for designing comprises selecting a bent structure suitable for QPM nonlinear optical wave mixing, comprising selecting materials for a radiation propagation portion of the bent structure, e.g. a waveguide, and selecting dimensions of the bent structure taking into account the spatial variation of the nonlinear optical susceptibility along the structure as experienced by radiation travelling along the bent structure. At least one dimension of the bent structure are selected such that QPM nonlinear optical wave mixing is obtained. More particularly, at least one dimension of the radiation propagation portion of the bent structure is selected taking into account the spatial variation of the nonlinear optical susceptibility along the radiation propagation structure as experienced by radiation travelling along the bent structure for obtaining quasi-phase matched nonlinear optical wave mixing in the radiation propagation portion. The dimension may be substantially inverse proportional with the linear phase mismatch for the nonlinear optical wave mixing. The method for designing furthermore may be adapted so that the structure provides cavity enhancement for at least one of the radiation beams that will travel in the system, i.e. for which the system is designed, preferably more or all of the radiation beams are cavity enhanced.

Figure 12:
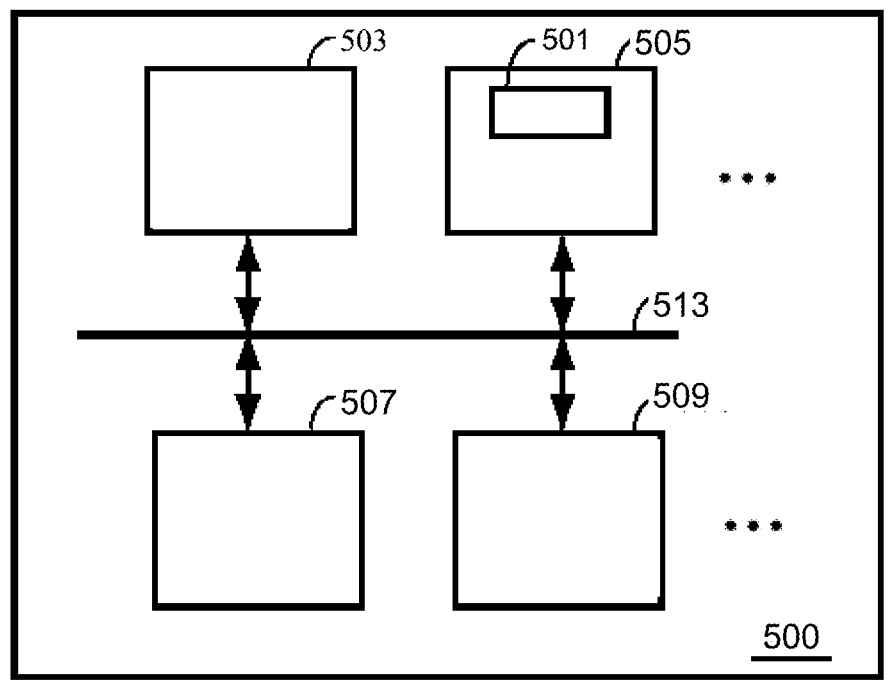
FIG. 12 illustrates a computing system as can be used in embodiments of the present invention for performing a method of resonating, converting or amplifying.

In a further aspect, the above described methods for designing or controlling a system for resonating, converting or amplifying using QPM nonlinear optical wave mixing e.g. the controller may be at least partly implemented in a processing system 500 such as shown in FIG. 12. FIG. 12 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. For example, the determination of test pulse properties may be a computer implemented step. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 12. The memory of the memory subsystem 505 may at some time hold part or all (in either case shown as 501) of a set of instructions that when executed on the processing system 500 implement the steps of the method embodiments described herein. A bus 513 may be provided for connecting the components. Thus, while a processing system 500 such as shown in FIG. 12 is prior art, a system that includes the instructions to implement aspects of the methods for controlling resonating and/or converting and/or amplifying using a QPM nonlinear optical process is not prior art, and therefore FIG. 12 is not labeled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include a DVD, a USB-stick, or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

Figure 21:
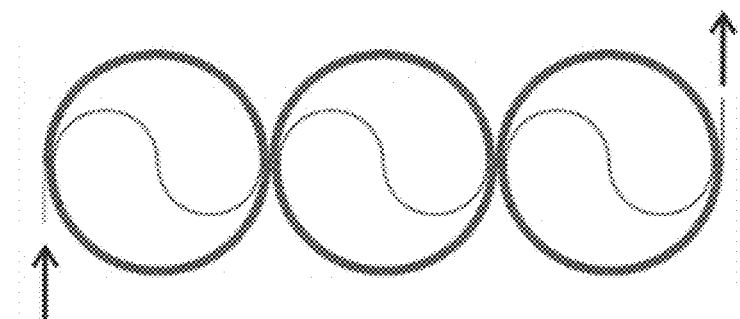
FIG. 21 illustrates a schematic overview of a system for operation in the quasi-phase matched regime using cascading spirals, according to an embodiment of the present invention.

By way of illustration, in FIG. 21 an example of a system for operating in quasi-phase matched regime is shown, whereby cascading spirals are used. The cascading spirals configuration results in a good efficiency for quasi-phase matching. The system is based on a uniform three-dimensional material, in the present example the material is silicon. In this system, no 2D layer is required on top of the uniform three dimensional material.

The invention claimed is:

1. A system for conversion or amplification using a quasi-phase matched nonlinear optical wave mixing, the system comprising:
    a first radiation source configured for providing a pump radiation beam,
    a second radiation source configured for providing a signal radiation beam, and
    a bent structure configured for receiving the pump radiation beam and the signal radiation beam,
    wherein a radiation propagation portion of the bent structure is made of a uniform three-dimensional material at least partly covered by a layer of two-dimensional material or quasi-two-dimensional material and wherein the radiation propagation portion comprises a dimension taking into account the spatial variation of the nonlinear optical susceptibility along the radiation propagation portion as experienced by radiation travelling along the bent structure for obtaining quasi-phase-matched nonlinear optical wave-mixing in the radiation propagation portion, the dimension being substantially inverse proportional with the linear phase mismatch for the nonlinear optical wave mixing, an outcoupling radiation propagation portion configured for coupling out an idler radiation beam generated in the bent structure.

2. A system according to claim 1, wherein said two-dimensional or quasi-two-dimensional material layer induces the quasi-phase matched wave mixing.

3. A system according to claim 1, wherein the two-dimensional or quasi-two-dimensional material comprises one or a combination of graphene, graphyne, borophene, germanene, silicene, stanine, phosphorene, metals, 2D supracrystals, hexagonal boron nitride, germanane, nickel HITP, transition metal di-chalcogenides (TMDCs), MXenes black phosphorus, or topological insulators.

4. A system according to claim 1, wherein the three-dimensional material is any or a combination of silicon, germanium, GaAs, InGaAs, diamond, cadmium telluride, gallium indium phosphide, indium phosphide, SiN, $Ba(NO_3)_2$, $CaCO_3$, $NaNO_3$, tungstate crystals, $BaF_2$, potassium titanyl phosphate (KTP), potassium dihydrogen phosphate (KDP), $LiNbO_3$, deuterated potassium dihydrogen phosphate (DKDP), lithium triborate (LBO), barium borate (BBO), bismuth triborate (BIBO), $LiIO_3$, $BaTiO_3$, yttrium iron garnet (YIG), AlGaAs, CdTe, $AgGaS_2$, $KTiOAsO_4$ (KTA), $ZnGeP_2$ (ZGP), $RBTiOAsO_4$ (RTA).

5. A system according to claim 1, wherein the three-dimensional material is provided as a waveguide and/or wherein the layer of two-dimensional or quasi-two-dimensional material is a full layer covering the three-dimensional material.

6. A system according to claim 5, wherein the layer of two-dimensional or quasi-two-dimensional material is a graphene layer or wherein the two-dimensional or quasi-two-dimensional material is adapted for having an electric current flowing through it or wherein the layer of two-dimensional or quasi-two dimensional material is a $MoS_2$ layer.

7. A system according to claim 1, wherein the radiation propagation portion comprises a uniform three-dimensional material covered by a layer of two-dimensional or quasi-two-dimensional material that is patterned.

8. A system according to claim 7, wherein the two-dimensional or quasi-two-dimensional material layer is patterned such that periodic variations in the nonlinear optical susceptibility are introduced.

9. A system according to claim 7, wherein the layer of two-dimensional or quasi-two-dimensional material has a pie-shaped patterning.

10. A system according to claim 1, wherein the layer of two-dimensional or quasi-two-dimensional material is a full layer, but wherein the full layer is locally chemically or electrically modified, so as to induce a spatial pattern in the properties of the layer.

11. A system according to claim 1, wherein the nonlinear optical wave mixing is nonlinear optical three-wave mixing.

12. A system according to claim 11, wherein the uniform three-dimensional material is a quadratically nonlinear optical material and wherein the process is a quasi-phase-matched sum-frequency generation or quasi-phase-matched difference-frequency generation or wherein the two-dimensional or quasi-two-dimensional material is a quadratically nonlinear optical material and wherein the process is a quasi-phase-matched sum-frequency generation or quasi-phase-matched difference-frequency generation.

13. A system according to claim 1, wherein the bent structure is a closed structure or any of a circular ring, an elliptical ring, a rectangular shaped structure, an octagonally shaped structure, a circular disc or an elliptical shaped disc, a snake-like structure, a sickle-like structure, a spiral-like structure.

14. A system according to claim 13, wherein the structure is a circular ring, and where the radius R of the ring structure is determined substantially inverse proportional with the linear phase mismatch for the nonlinear optical wave mixing.

15. A system according to claim 14, wherein the radius R of the circular ring structure is determined by the relation $$R = s\frac{4}{\Delta k_{linear}},$$

with s being a factor equal to a positive or negative integer so that R has a positive value and $\Delta k_{linear}$ being the linear phase mismatch for Raman-resonant four-wave-mixing or being the linear phase mismatch for Kerr-induced four-wave-mixing, and/or, wherein the radius R of the circular ring structure is determined by the relation $$R = s\frac{1}{\Delta k_{linear}}$$

with s being a factor equal to a positive or negative integer so that R has a positive value and $\Delta k_{linear}$ being the linear phase mismatch for sum-frequency generation or being the linear phase mismatch for difference-frequency generation.

16. A system according to claim 1, wherein the bent structure has an inscribed circle and/or circumscribed circle having a radius inversely proportional to the linear phase mismatch for the nonlinear optical wave mixing or wherein the bent structure has an average radius inversely proportional to the linear phase mismatch for the nonlinear optical wave mixing and/or wherein the system furthermore being arranged for providing a pump radiation beam with wavenumber $k_p$ and a signal radiation beam with wavenumber $k_s$ and result in an idler radiation beam with wavenumber $k_i$, so that at least one of these beams is at ring resonance and as such at least one of these beams' wavenumbers yields, when multiplying with R, an integer number.

17. A system according to claim 16, wherein the system comprises a heating and/or cooling means and a temperature controller configured for controlling the temperature so that at least one of the pump radiation, the signal radiation and the idler radiation is at ring resonance.

18. A system according to claim 1, wherein the two-dimensional or quasi-two-dimensional material is a Raman-active material, and wherein the process is a quasi-phase-matched Raman-resonant four-wave-mixing process and/or wherein the two-dimensional or quasi-two-dimensional material is a Kerr-nonlinear material and wherein the process is a quasi-phase-matched Kerr-induced four-wave-mixing process and/or wherein furthermore a controller is provided for tuning the system with respect to an output wavelength, an output power or an obtained bandwidth and/or wherein the system is adapted for selecting a TE or TM output by selecting a TE or TM input.

19. A method for obtaining conversion or amplification, using a quasi-phase-matched nonlinear optical wave mixing process, the method comprising:

receiving a pump radiation beam and a signal radiation beam in a bent structure, a radiation propagation portion of the bent structure being made of a uniform three-dimensional material at least partly covered by a two-dimensional or quasi-two-dimensional material layer and comprising a dimension taking into account the spatial variation of the nonlinear optical susceptibility along the radiation propagation portion as experienced by radiation travelling along the bent structure for obtaining the quasi-phase-matched nonlinear optical wave mixing in the radiation propagation portion, the dimension being substantially inverse proportional with the linear phase mismatch for the nonlinear optical wave mixing, obtaining an idler radiation beam by interaction of the pump radiation beam and the signal radiation beam coupling out an idler radiation beam from the bent structure.

20. A method for designing a converter or amplifier using a quasi-phase-matched nonlinear optical wave mixing, the converter or amplifier using a pump radiation beam and a signal radiation beam, the method comprising selecting a bent structure made of a uniform three-dimensional material at least partly covered by a layer of two-dimensional or quasi-two-dimensional material suitable for a quasi-phase-matched nonlinear optical wave mixing comprising selecting a nonlinear optical material for a radiation propagation portion of the bent structure and selecting a dimension of the radiation propagation portion taking into account the spatial variation of the nonlinear optical susceptibility along the radiation propagation structure as experienced by radiation travelling along the bent structure for obtaining the quasi-phase-matched nonlinear optical wave mixing in the radiation propagation portion, the dimension being substantially inverse proportional with the linear phase mismatch for the nonlinear optical wave-mixing.

* * * * *

UNITED STATES PATENT AND TRADEMARK OFFICE
CERTIFICATE OF CORRECTION

| | | |
|---|---|---|
| PATENT NO. | : 9,915,852 B2 | Page 1 of 1 |
| APPLICATION NO. | : 15/469097 | |
| DATED | : March 13, 2018 | |
| INVENTOR(S) | : Vermeulen et al. | |

It is certified that error appears in the above-identified patent and that said Letters Patent is hereby corrected as shown below:

In the Specification

Column 24
Line 9, change "$\sigma_j^2 = \kappa_j^2 = 1$" to -- $\sigma_j^2 + \kappa_j^2 = 1$ --

Column 29
Line 9, change "R=25 Ξm" to -- R=25 μm --
Line 16, change "×33 dB" to -- –33 dB --

Column 37
Line 14, change "$k= -2k_p + k_s + k_i$" to -- $\Delta k = -2k_p + k_x + k_i$ --

Signed and Sealed this
First Day of May, 2018

Andrei Iancu
*Director of the United States Patent and Trademark Office*